(12) United States Patent
Matsumoto et al.

(10) Patent No.: US 11,825,038 B2
(45) Date of Patent: Nov. 21, 2023

(54) READING APPARATUS AND IMAGE FORMING SYSTEM FOR OUTPUTTING MAINTENANCE INFORMATION

(71) Applicants: Tohru Matsumoto, Kanagawa (JP); Kohta Aoyagi, Kanagawa (JP); Tatsuya Ishii, Kanagawa (JP); Kimiharu Yamazaki, Kanagawa (JP); Satoshi Nakayama, Kanagawa (JP); Ryosuke Ebinuma, Tokyo (JP); Ryoh Ishitsuka, Kanagawa (JP)

(72) Inventors: Tohru Matsumoto, Kanagawa (JP); Kohta Aoyagi, Kanagawa (JP); Tatsuya Ishii, Kanagawa (JP); Kimiharu Yamazaki, Kanagawa (JP); Satoshi Nakayama, Kanagawa (JP); Ryosuke Ebinuma, Tokyo (JP); Ryoh Ishitsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/701,513

(22) Filed: Mar. 22, 2022

(65) Prior Publication Data
US 2022/0321708 A1   Oct. 6, 2022

(30) Foreign Application Priority Data
Mar. 30, 2021   (JP) .................................. 2021-057580

(51) Int. Cl.
*H04N 1/00* (2006.01)
(52) U.S. Cl.
CPC ..... *H04N 1/00068* (2013.01); *H04N 1/00005* (2013.01); *H04N 1/00015* (2013.01); *H04N 1/00034* (2013.01); *H04N 1/00045* (2013.01); *H04N 1/00074* (2013.01); *H04N 1/00822* (2013.01); *H04N 1/00063* (2013.01)

(58) Field of Classification Search
None
See application file for complete search history.

(56) References Cited

U.S. PATENT DOCUMENTS

| | | | | |
|---|---|---|---|---|
| 7,777,773 | B2 * | 8/2010 | Ng ..................... | H04N 1/00053 347/240 |
| 10,771,640 | B2 * | 9/2020 | Tachibana ............. | G06F 3/1234 |
| 11,201,971 | B1 * | 12/2021 | Tanaka ............... | H04N 1/00074 |
| 2018/0364627 | A1 | 12/2018 | Kobayashi et al. | |

FOREIGN PATENT DOCUMENTS

| | | |
|---|---|---|
| JP | 2003-244375 A | 8/2003 |
| JP | 2005-217615 A | 8/2005 |
| JP | 2019-158757 | 9/2019 |
| JP | 2020-149004 A | 9/2020 |

OTHER PUBLICATIONS

Translation of JP-2005217615-A published Aug. 2005.*
Translation of JP-2020149004-A published Sep. 2020.*
Extended European Search Report dated Aug. 16, 2022 issued in corresponding European Appln. No. 22163921.4.

* cited by examiner

*Primary Examiner* — Scott A Rogers
(74) *Attorney, Agent, or Firm* — Harness, Dickey & Pierce, P.L.C.

(57) ABSTRACT

A reading apparatus includes a reading device and processing circuitry. The reading device reads a recording medium. The processing circuitry outputs maintenance information based on read information read by the reading device.

3 Claims, 22 Drawing Sheets

| SET ITEMS | SET VALUE | | |
|---|---|---|---|
| DISPLAY START TIME OF MAINTENANCE INFORMATION | THREE MONTHS PRIOR TO MAINTENANCE | TWO MONTHS PRIOR TO MAINTENANCE | ONE MONTH PRIOR TO MAINTENANCE |
| NUMBER OF TIMES OF DISPLAY OF MAINTENANCE INFORMATION | THREE TIMES | TWO TIMES | ONE TIME |

| READING MODE | SHEET USED FOR CALCULATION OF MAINTENANCE TIMING | FREQUENCY OF READING FIRST RECORDING MEDIUM | | |
|---|---|---|---|---|
| 1 | FIRST RECORDING MEDIUM | 100 SHEETS / 1 TIME | 300 SHEETS / 1 TIME | 300 SHEETS / 1 TIME |
| 2 | SECOND RECORDING MEDIUM | — | — | — |
| 3 | FIRST RECORDING MEDIUM AND SECOND RECORDING MEDIUM | 100 SHEETS / 1 TIME | 300 SHEETS / 1 TIME | 300 SHEETS / 1 TIME |

|   | OUTPUT MAINTENANCE TIMING TO: |
|---|---|
| 1 | OPERATING DEVICE 140 |
| 2 | OPERATING DEVICE 140, INFORMATION COMMUNICATION TERMINAL 500 |
| 3 | INFORMATION COMMUNICATION TERMINAL 500 |

READING APPARATUS AND IMAGE FORMING SYSTEM FOR OUTPUTTING MAINTENANCE INFORMATION

CROSS-REFERENCE TO RELATED APPLICATION

This patent application is based on and claims priority pursuant to 35 U.S.C. § 119(a) to Japanese Patent Application No. 2021-057580, filed on Mar. 30, 2021, in the Japan Patent Office, the entire disclosure of which is hereby incorporated by reference herein.

BACKGROUND

Technical Field

Embodiments of the present disclosure relate to a reading apparatus and an image forming system.

Related Art

Apparatuses are known to compare a print image with a read image, which has been obtained by reading an image printed on a recording medium based on the print image by a reading device, to detect a defect of the read image.

SUMMARY

Embodiments of the present disclosure described herein provide a novel reading apparatus including a reading device and processing circuitry. The reading device reads a recording medium. The processing circuitry outputs maintenance information based on read information read by the reading device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
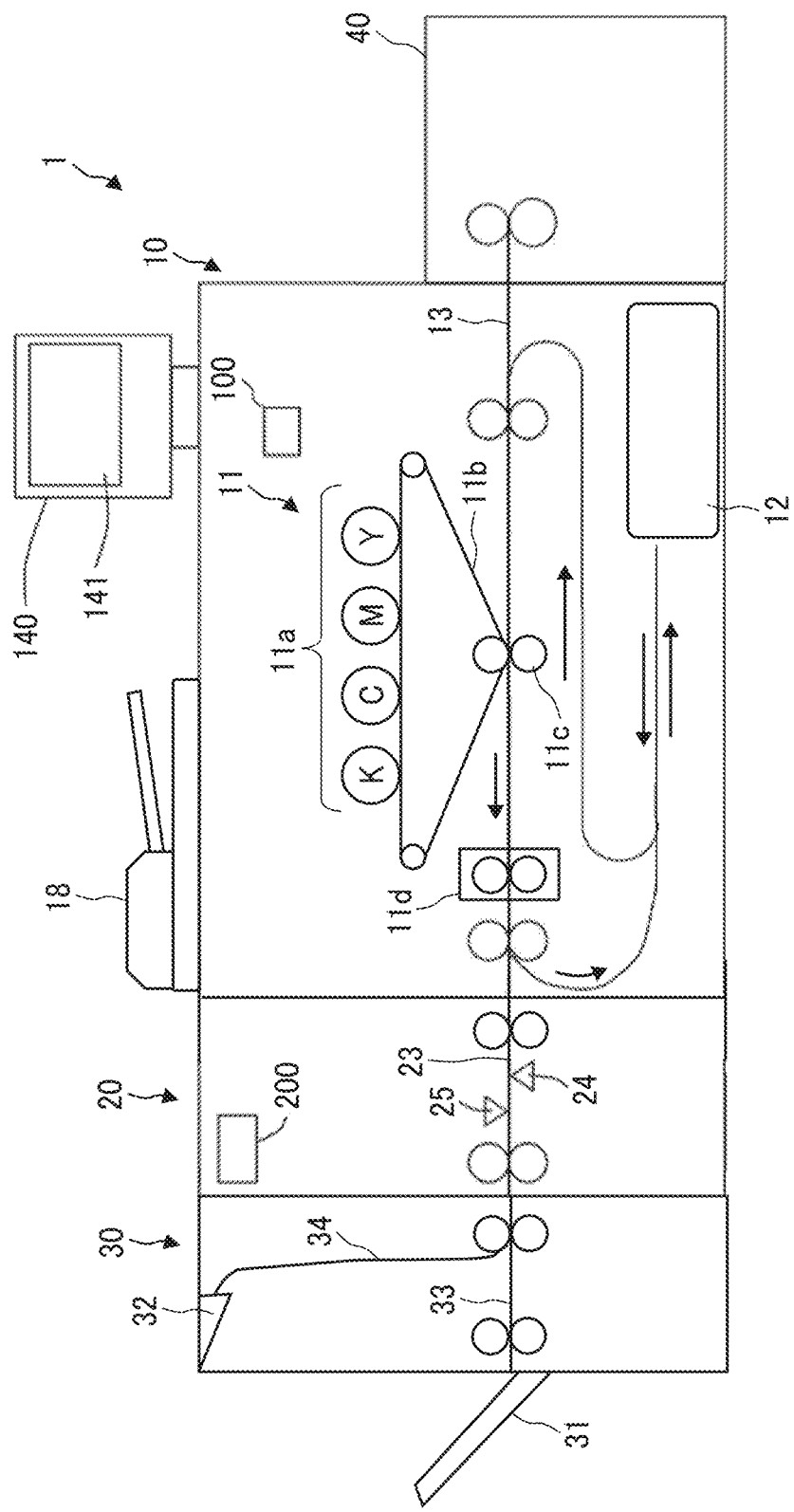
FIG. 1 is a schematic diagram illustrating an image forming system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Descriptions are given of embodiments of the present disclosure, with reference to the drawings. Note that the following embodiments are not limiting the present disclosure and any deletion, addition, modification, change, etc. can be made within a scope in which person skilled in the art can conceive including other embodiments, and any of which is included within the scope of the present disclosure as long as the effect and feature of the present disclosure are demonstrated. It is to be noted that elements (for example, mechanical parts and components) having the same functions and shapes are denoted by the same reference numerals throughout the specification and redundant descriptions are omitted.

FIG. 1 is a diagram illustrating a schematic configuration of an image forming system according to embodiments of the present disclosure.

The image forming system 1 includes a sheet feeding device 12, a sheet feeding device 40, an image forming apparatus 10 that forms an image, a reading apparatus 20, and a post-processing apparatus 30.

The above-described devices and apparatuses are electrically and mechanically connected to each other, so that the devices and apparatuses can communicate with each other and convey a sheet P between the devices and apparatuses.

In the present embodiment, the image forming system 1 may not include the sheet feeding device 40 and the post-processing apparatus 30 or may include other devices or apparatuses. In the present embodiment, the image forming system 1 has a configuration as an information processing apparatus.

Each of the sheet feeding devices 12 and 40 includes a plurality of sheet feeding trays and supplies a sheet P as a recording medium stored in any one of the plurality of sheet feeding trays to the image forming apparatus 10.

The material of the recording medium is not limited to paper, and may include another material such as cloth or plastic.

The sheet P conveyed from the sheet feeding device 12 or the sheet feeding device 40 is conveyed through a sheet conveyance passage 13, and an image forming unit 11 forms an image on the sheet P. The image forming unit 11 includes photoconductors 11a for respective colors (cyan, magenta, yellow, and black). After each of the photoconductors 11a is uniformly charged by a charger included in the image forming apparatus 10, laser light is irradiated from the laser diode (LD) to the photoconductors 11a to form respective latent images on the photoconductors 11a.

The latent images on the photoconductors 11a are developed into toner images by the corresponding developing devices. Then, the toner images on the photoconductors 11a are transferred onto the surface of an intermediate transfer belt 11b to form a composite toner image. Thus, the composite toner image on the intermediate transfer belt 11b is transferred onto a sheet P at a secondary transfer unit 11c.

After an image is formed on the sheet P, the sheet P is conveyed along the sheet conveyance passage 13 to a fixing device 11d. In the fixing device 11d, the image on the sheet P is fixed to the sheet P.

The image forming unit 11 may perform monochrome image formation such as black image formation.

Further, sheet reverse passages may be provided at positions upstream and downstream from the image forming unit 11 in a conveyance direction of the sheet P to perform reverse conveyance of a sheet P, so that image formation is performed on both sides of the sheet P.

An operating device 140 is provided in an upper portion of the image forming apparatus 10 and includes a liquid crystal display (LCD) 141 serving as a display unit having a touch screen and a group of operation keys such as numeric keys serving as an operating unit. The operating device 140 may include an operating unit and a display unit as separate units. For example, the operating unit may be a mouse, a tablet, or a terminal.

Further, the LCD 141 may be detachably attached to the image forming apparatus 10.

An automatic document feeder (ADF) 18 automatically feeds an original document (or original documents) set on an original document loading table. The original document (or the original documents) is read by a scanner.

The image forming system 1 includes an image controller 100 and a reading controller 200.

The image controller 100 controls the overall image forming system 1.

The image controller 100 includes, for example, a central processing unit (CPU), a read only memory (ROM), and a random access memory (RAM). The CPU controls each unit of the image forming system 1 based on a program stored in the ROM while using the RAM as a working memory to execute basic processing as the image forming system 1.

Further, control within each of the image forming apparatus 10, the reading apparatus 20, and the post-processing apparatus 30 may be performed, for example, by the image controller 100. The image forming apparatus 10, the reading apparatus 20, and the post-processing apparatus 30 may be configured to have individual controllers. In such a case, for example, the image controller 100 may be a main controller, and the individual controllers may operate under the control of the image controller 100. The individual controllers, for example, may have substantially the same configuration as the configuration of the image controller 100.

In FIG. 1, the reading apparatus 20 includes the reading controller 200 as a controller separate from the image controller 100.

The reading apparatus 20 includes a reading device 24 that reads an image on a lower surface of the sheet P conveyed through a sheet conveyance passage 23 and a reading device 25 that reads an image on an upper surface of the sheet P. The reading apparatus 20 is disposed downstream from the image forming apparatus 10 in the conveyance direction. The reading devices 24 and 25 read an image of the sheet P conveyed on the sheet conveyance passage 23 over the entire sheet P in the direction intersecting the conveyance direction.

The direction intersecting the conveyance direction of the sheet P is also referred to as a "width direction" or a "main scanning direction", and the conveyance direction is also referred to as a "sub-scanning direction".

Figure 2:
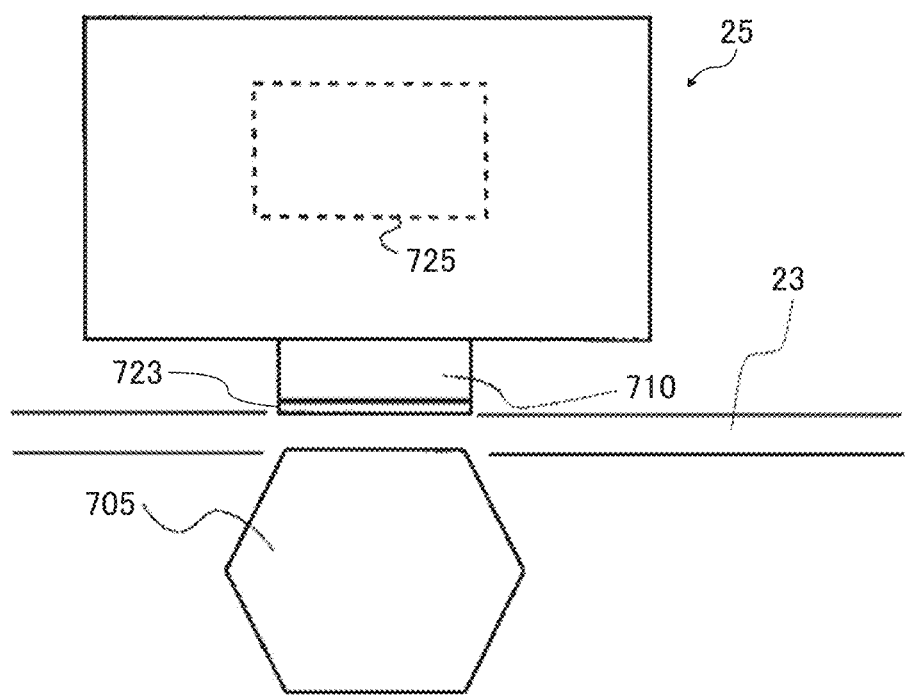
FIG. 2 is a diagram illustrating an example of a configuration of a reading device of a reading apparatus included in the image forming system.

FIG. 2 is a diagram illustrating an example of a configuration of a reading device of a reading apparatus included in the image forming system.

As illustrated in FIG. 2, the reading device 25 includes an irradiator 710 and a line image sensor. The irradiator 710 irradiates the sheet P with light when the sheet P passes through a reading position. The line image sensor includes multiple imaging elements 725 that perform photoelectric conversion for each pixel. The imaging elements 725 are disposed in a one-dimensional shape along the width direction of the sheet P. A line sensor is provided with a charge-coupled device (CCD) sensor or a complementary metal oxide semiconductor (CMOS) sensor, for example.

The reading device 25 repeatedly performs a reading operation of an image for one line extending in the width direction in accordance with a passing operation of the sheet P that passes the reading position, so as to read the image printed on the sheet P as a two-dimensional image. Each of the multiple imaging elements 725 is an optical sensor that performs a reading operation on an image formed on the sheet P at the reading position.

The background switching revolver 705 is a background member and disposed at a position facing the imaging elements 725 across the sheet conveyance passage 23 to reflect irradiation light with which the sheet P is irradiated when the image on the sheet P is read. The irradiator 710 includes an exposure glass 723 disposed facing the background switching revolver 705. The exposure glass 723 penetrates light emitted from the irradiator 710 and reflected light returning after the emitted light is reflected by the background switching revolver 705 or the sheet P.

Note that the reading device 24 has a substantially identical structure to the reading device 25 and includes an irradiator 710 and imaging elements 725. Different from the reading device 25, the irradiator 710 and the imaging elements 725 of the reading device 24 are disposed vertically opposite with respect to the background switching revolver 705 across the sheet conveyance passage 23. To be more specific, the background switching revolver 705 is disposed above the sheet conveyance passage 23 and the irradiator 710 and the imaging elements 725 of the reading device 24 are disposed below the sheet conveyance passage 23.

A reading result read by the reading device 24 or the reading device 25 is transmitted to the reading controller 200 as a read image (also referred to as "read information"), and then is transmitted from the reading controller 200 to the image controller 100.

The image controller 100 determines the presence or absence of a defect in the image based on, for example, comparison between the read image and the print image. Further, the image controller 100 may acquire information (for example, a luminance value at a predetermined position, threshold for comparison) in advance to be compared with the read image using the print image and perform an image inspection using the acquired information and the read image.

As the print image, print image data (referred to as rasterized image data) obtained by converting print data using a raster image processor (RIP), or image data obtained by scanning an original document are used.

The image controller 100 is configured to output maintenance information to a predetermined output destination based on a determination result obtained by determining whether the image has a defect.

The read image may be a result obtained by reading one side of the sheet P or both sides of the sheet P. Further, a single reading device may be provided and a reverse conveyance passage may be provided before and after the reading device to perform reverse conveyance of a sheet P so that images on the front and back sides (first and second faces) of the sheet P are read by the single reading device.

The post-processing apparatus 30 performs a stapling operation or a punching operation. The post-processing apparatus 30 further performs the post-processing operation including a folding operation, for example, at least one of letter fold-in, saddle stitching, Z-fold, gate fold, or French fold. The sheet P on which post-processing operation is performed is ejected to a first sheet ejection unit 31 via a sheet conveyance passage 33. The sheet P on which the post-processing operation is not performed is ejected to a second sheet ejection unit 32.

When it is determined that the sheet P has a defect in the image, the defective sheet P may be ejected to a sheet ejection destination different from a sheet ejection unit for a sheet P without any defect.

The reading apparatus 20 may be provided inside a housing of the image forming apparatus 10, or the image forming apparatus 10 and the reading apparatus 20 may not be mechanically connected to each other.

As described above, the example of the image forming system 1 has been explained.

The reading controller 200 may determine the presence or absence of a defect in an image.

The reading controller 200 performs, for example, an image inspection for comparing a read image with a print image to determine whether an image has a defect. As the print image, for example, rasterized image data may be received from the image controller 100, or image data obtained by reading an original document by the reading devices 24 and 25 in advance may be used.

Further, similarly to the image controller 100, the reading controller 200 may acquire information to be compared with the read image using the print image and inspect the read image using the acquired information.

Next, an image inspection to determine the presence or absence of a defect in an image is described.

The image inspection is performed by the image controller 100 or the reading controller 200 in the image forming system 1, and maintenance information is output as an inspection result.

The image inspection may be performed by the reading apparatus 20, and maintenance information may be output. In this case, the reading apparatus (reading apparatus 20) may include, for example, a reading device (reading device 25) that reads a recording medium and an output unit (for example, reading controller 200) that outputs maintenance information based on read information read by the reading device. The device and units in parentheses are components of FIG. 1 (or FIGS. 22 and 23 described below) associated as an example.

A case where the reading controller 200 performs image inspection in each embodiment is described below.

First Embodiment

Figure 4A:
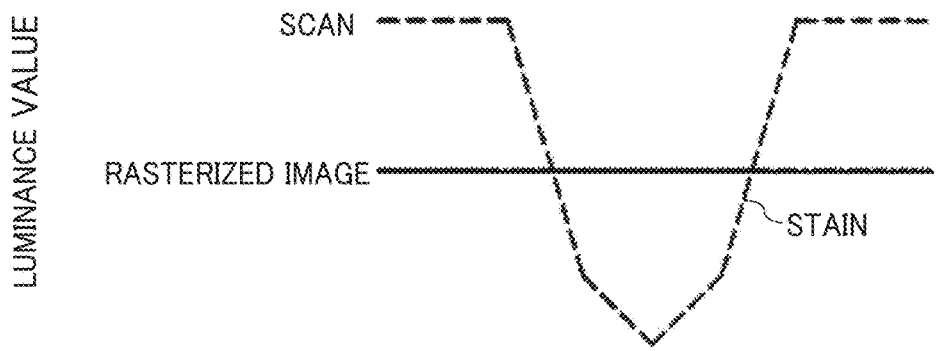
FIGS. 4A, 4B and 4C are diagrams illustrating a difference image in a case where the scanned image has a stain and the luminance value of a rasterized image is low.
Figure 4B:
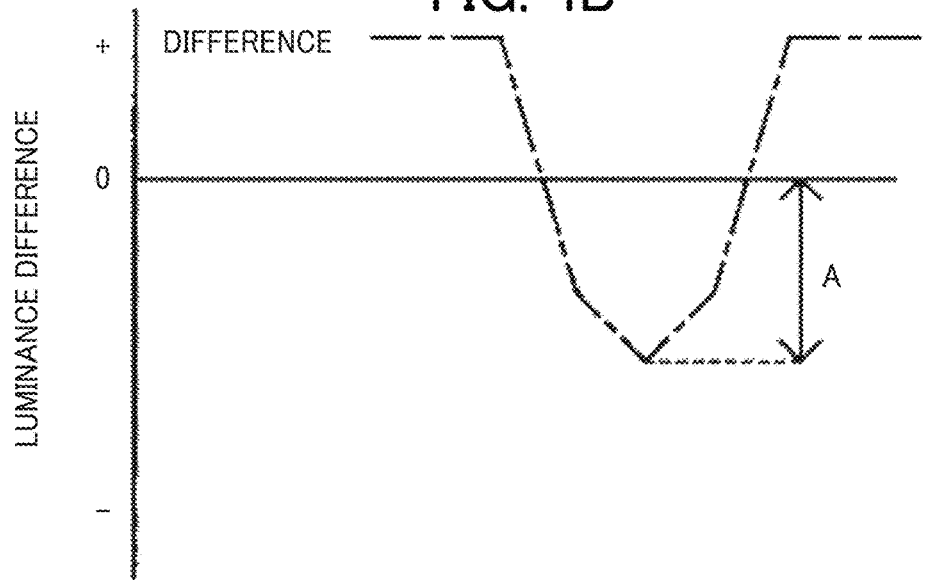
Figure 4C:
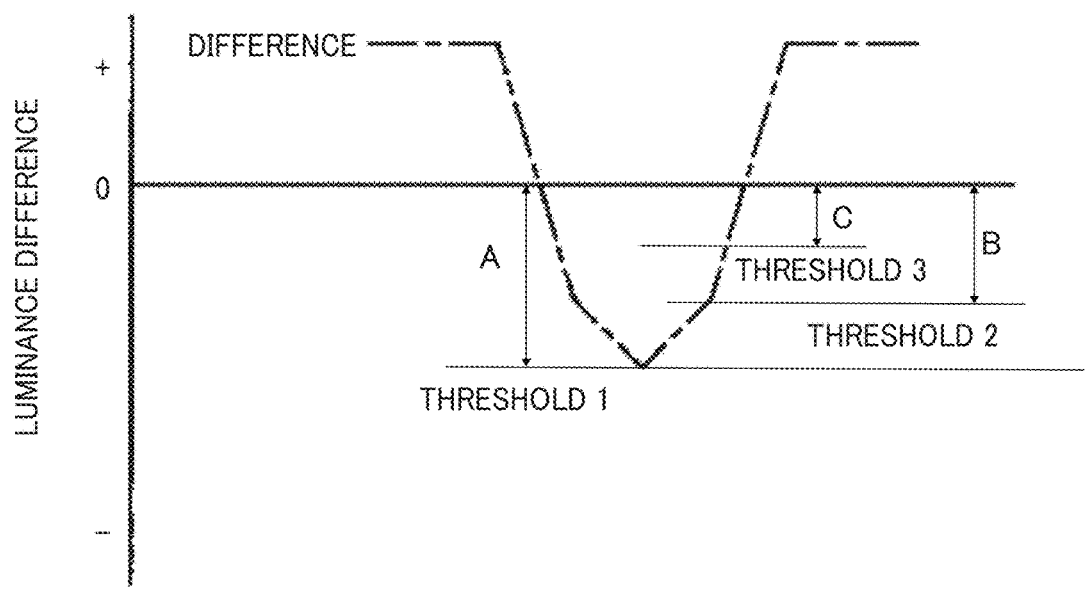
Figure 5:
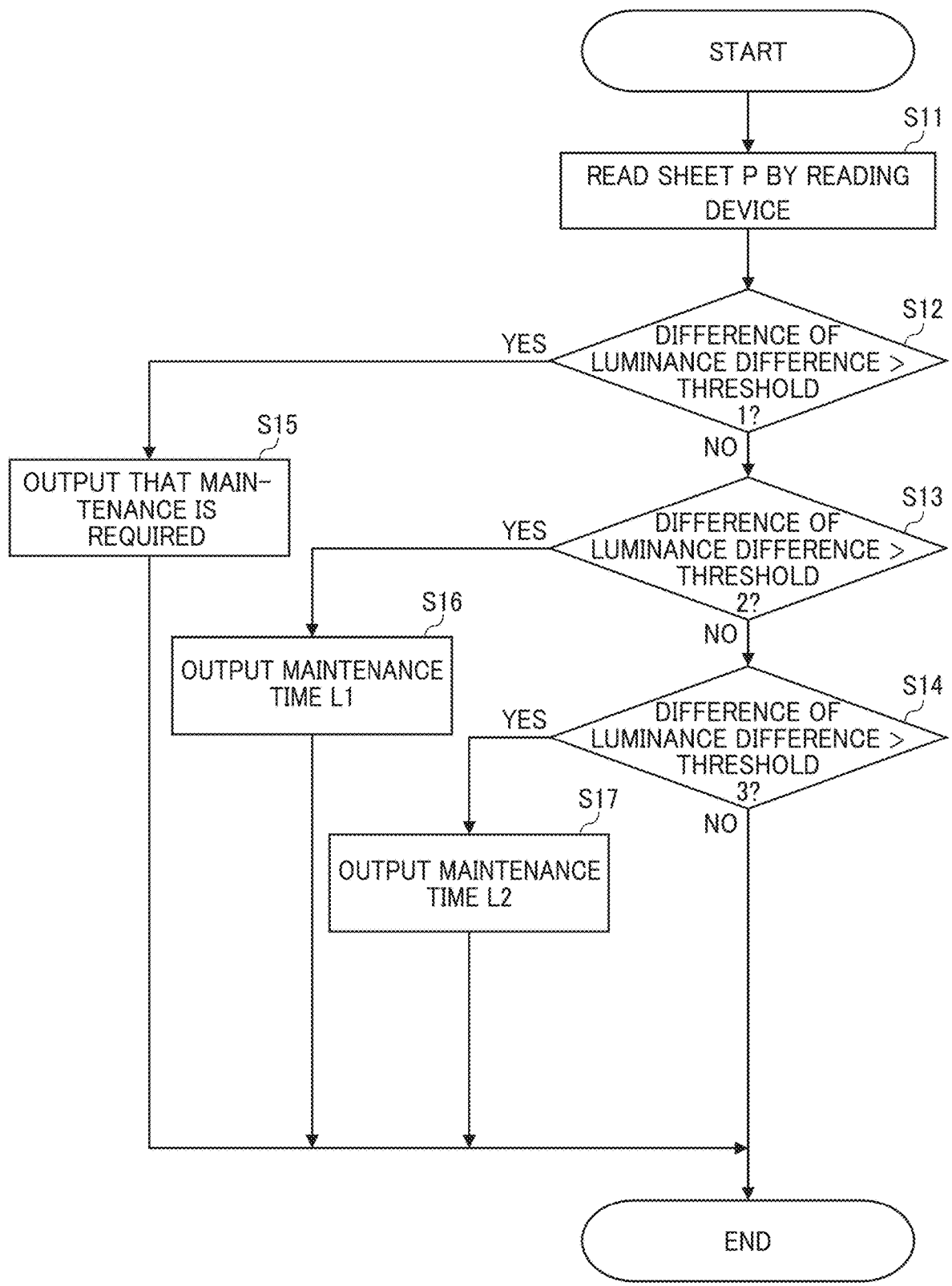
FIG. 5 is a flowchart of an operation of an image inspection according to a first embodiment of the present disclosure.

Descriptions are given of an image inspection, according to the first embodiment, with reference to FIGS. 3 to 5.

In the following description, "scanned image data" indicates read image data obtained by reading the sheet P by the reading devices 24 and 25. The "scanned image data" is an example of read information.

In order to compare the rasterized image data with the scanned image data, the reading controller 200 performs at least one or more processing such as color conversion, resolution conversion, and position adjustment on the rasterized image data.

In response to a completion of this processing, the reading controller 200 generates a difference image from the converted rasterized image data and scanned image data. The difference image is generated by calculating a difference between pixel values of respective pixels.

At this time, the reading controller 200 may set a portion where there is no difference between the rasterized image data and the scanned image data as an intermediate value (128 in the case of 256 gradations), and may define a difference in the positive direction (a scanned image is brighter) and a difference in the negative direction (the scanned image is darker).

Then, in order to detect a portion (edge) having a large variation in value with respect to the adjacent pixel in the difference image, the reading controller 200 performs processing of applying an edge detection filter to the difference image to emphasize the edge. Due to this processing, a portion where the variation of the value between pixels is large is emphasized.

The pixels to be compared are selected to have a predetermined interval. The predetermined interval is not limited, but adjacent pixels are desirable to be compared.

As the edge detection filter, for example, Sobel filter or Robinson filter is used, but the type of filter that is used is not particularly limited in the present disclosure.

After the processing by the edge detection filter, the reading controller 200 performs binarization processing using a predetermined threshold to determine the presence or absence of an edge. The threshold used in the binarization processing is set according to the defect level desired to be detected by a user.

Since the value after the edge detection filter processing changes depending on the coefficient of the edge detection filter to be used, it is desirable to set the threshold based on the type of the edge detection filter.

For example, a threshold associated with the type of filter may be stored in a storage unit in advance, then the threshold corresponding to the type of filter to be used may be used.

Further, learning based on past inspection results may be performed, then the threshold may be adjusted using the result of the learning.

In addition, since an edge portion of the image has a large gradation variation, a large difference is generated due to the positional deviation, which causes false detection.

Therefore, it is desirable to extract edge information from the rasterized image in advance to exclude the edge portion from an inspection target.

In addition, the edge portion may not be excluded from the inspection target, and may be determined differently from other portions. For example, a threshold different from a normal threshold may be used for the edge portion.

The above-described operation may be executed by the image controller 100 instead of the reading controller 200.

Figure 3A:
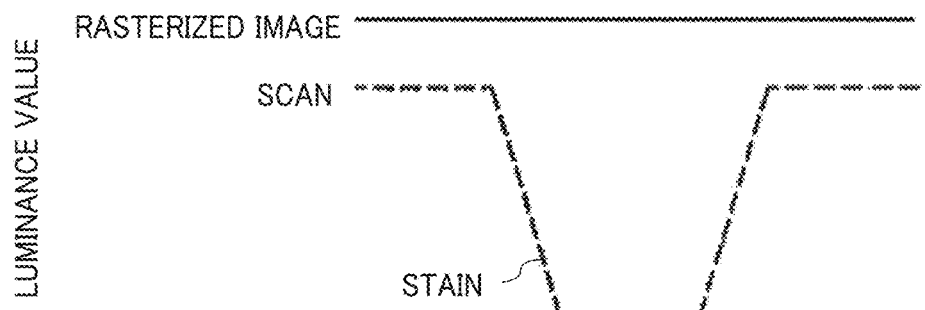
FIGS. 3A, 3B and 3C are diagrams illustrating a difference image in a case where a scanned image has a stain.
Figure 3B:
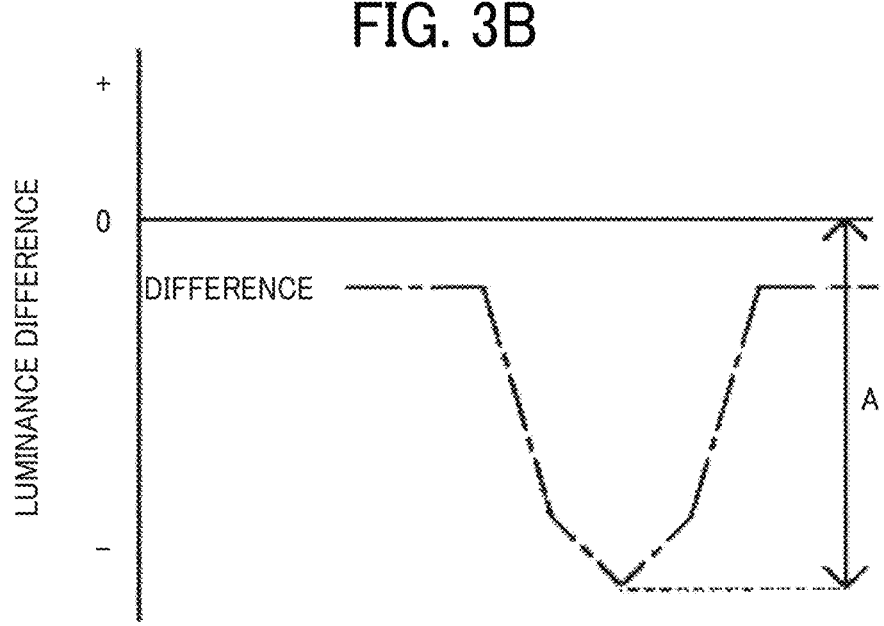
Figure 3C:
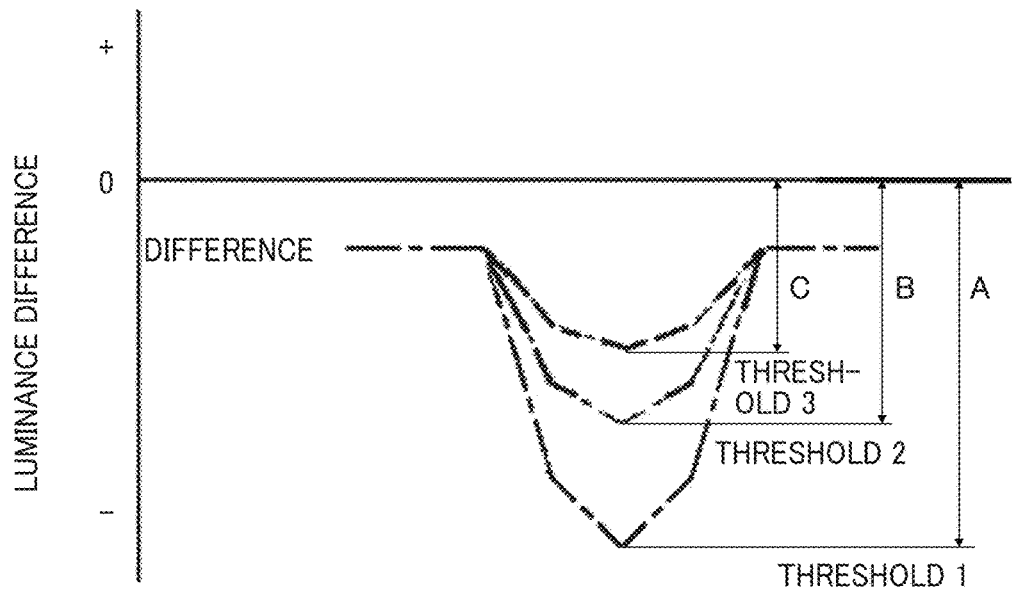

FIGS. 3A, 3B and 3C are diagrams illustrating a difference image in a case where the scanned image has a stain. FIG. 3 illustrates a difference between a luminance value of the scanned image data and a luminance value of the rasterized image data in a case where a blank portion or an image portion of the sheet P has a stain.

In a case where the scanned image has a stain, as illustrated in FIG. 3A, the luminance value of the scanned image data locally decreases due to the stain. Therefore, as illustrated in FIG. 3B, a luminance value of the difference image, which is the difference between the scanned image data and the rasterized image data, has the same shape. The difference of the luminance difference between the scanned image data and the rasterized image data becomes maximum at the size indicated by reference symbol A.

In the present embodiment, as illustrated in FIG. 3C, the presence or absence of stain is determined, using a plurality of thresholds, based on the magnitude of the difference between the scanned image and the rasterized image (an absolute value of the luminance value in the difference image).

The plurality of threshold values may be set in advance and stored in a memory area that is referred to by the reading controller 200 (or the image controller 100). Alternatively, the reading controller 200 may acquire the plurality of thresholds by allowing the reading controller 200 to receive the thresholds via communication.

FIGS. 4A, 4B and 4C are diagrams, each illustrating a difference image in a case where the luminance value of the rasterized image after the color change is holistically lower (the color is darker) than the luminance value of the rasterized image illustrated in FIG. 3. FIG. 4A illustrates the luminance value.

In the difference image in this case, as illustrated in FIG. 4B, the luminance value of the difference image is positive in a portion where there is no stain, and the luminance value is negative in a portion where there is a stain or stains.

In the present embodiment, as illustrated in FIG. 4C, the presence or absence of stain is determined based on the magnitude of the difference between the scanned image and the rasterized image (the absolute value of the luminance value in the difference image, which is the magnitude indicated by reference symbol A).

FIG. 5 is a flowchart of an exemplary operation of an image inspection, according to a first embodiment of the present disclosure.

The reading device 25 (including the reading device 24 in a case where images are formed on both sides of the sheet P) reads the sheet P (step S11).

Then, it is determined whether the difference (absolute value of the luminance value in the difference image) between the scanned image and the rasterized image is greater than the threshold 1 (step S12). When the difference between the scanned image and the rasterized image is greater than the threshold 1 (YES in step S12), the reading controller 200 outputs maintenance information indicating that the image on the sheet P has a defect (step S15).

The maintenance information may be, for example, a cleaning time or a component replacement time of a device that processes a recording medium, such as the image forming apparatus 10 that forms an image on the sheet P, the sheet feeding device 40, or the sheet conveyance passage 13. Further, the maintenance information may be, for example, maintenance time obtained based on information (luminance difference) in a printing area of the recording medium.

The output destination of the maintenance information may be, for example, the operating device 140 to display that the image has a defect on the LCD 141. Alternatively, the maintenance information may be output to the image controller 100. Further, the LCD 141 may display a message for prompt maintenance.

In a case where the difference between the scanned date and the rasterized date is smaller than the threshold 1 (NO in step S12), it is determined whether the difference between the scanned image data and the rasterized data is larger than the threshold 2 (step S13). When the difference between the scanned image data and the rasterized data is larger than the threshold 2 (YES in step S13), the reading controller 200 outputs the maintenance time to the operating device 140 or the image controller 100 as the maintenance information (step S16). The LCD 141 displays a maintenance time L1 when maintenance is recommended. Examples of the display include "Maintenance time comes after one month", "Maintenance time comes after 100 more sheets are printed", and "Cleaning time comes after one month". The maintenance time L1 may be associated with the threshold 2, or the number of printed sheets or time until the threshold 1 is reached may be calculated from the number of printed sheets P from the threshold 3 to the threshold 2.

In a case where the difference between the scanned date and the rasterized date is smaller than the threshold 2 (NO in step S13), it is determined whether the difference between the scanned image data and the rasterized data is larger than the threshold 3 (step S14). When the difference between the scanned image data and the rasterized data is larger than the threshold 3 (YES in step S14), the reading controller 200 outputs the maintenance time to the operating device 140 or the image controller 100 as maintenance information (step S17). LCD 141 displays a maintenance time L2 (larger than L1) when maintenance is recommended. Examples of the display include "Maintenance time comes after two months" or "Maintenance time comes when 200 more sheets are printed". The maintenance time L2 may be associated with the threshold 3, or the number of printed sheets or time until the threshold 1 is reached may be calculated from the number of printed sheets P from the previous maintenance time until the threshold 3 is reached.

According to the present embodiment, since a user may prepare for maintenance in advance by outputting the maintenance time in advance. As a result, a reduction in the time during which the device is not used (downtime) is achieved.

Although two thresholds, which are threshold 2 and threshold 3, are used for outputting the maintenance time, three or more thresholds or one threshold may be used.

Second Embodiment

Figure 6:
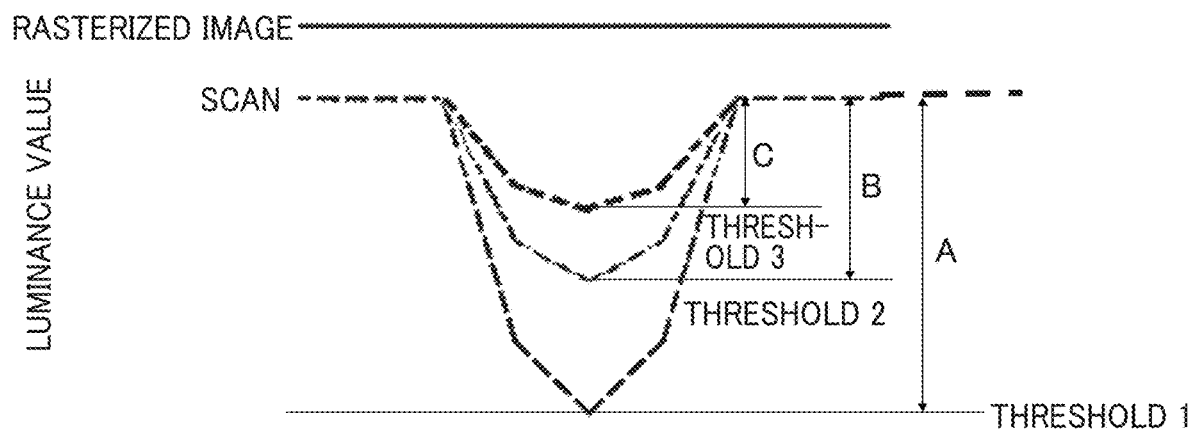
FIG. 6 is a diagram illustrating an image inspection using the luminance values illustrated in FIG. 3A.
Figure 7:
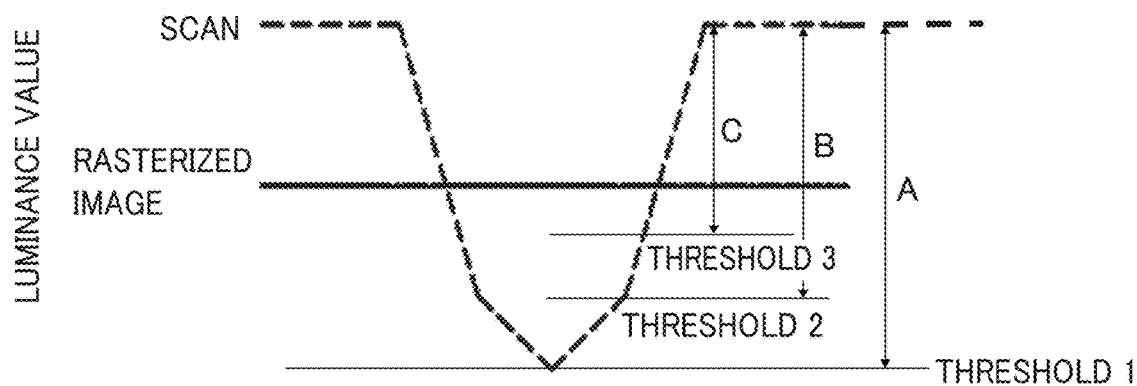
FIG. 7 is a diagram illustrating an image inspection using the luminance values illustrated in FIG. 4A.
Figure 8:
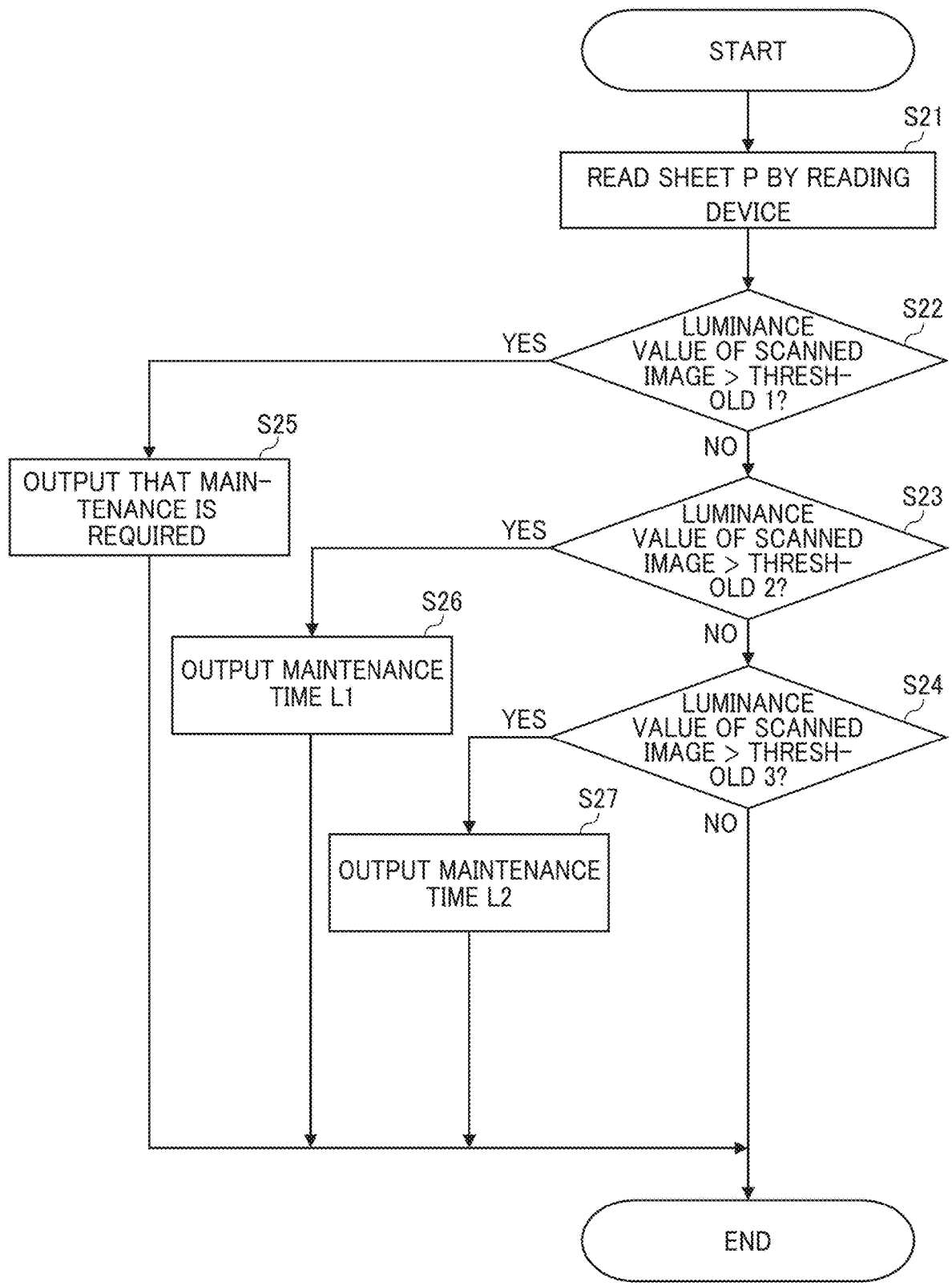
FIG. 8 is a flowchart of an operation of the image inspection according to a second embodiment of the present disclosure.

Next, descriptions are given of an image inspection according to a second embodiment, with reference to FIGS. 6 to 8.

FIG. 6 is a diagram illustrating the image inspection using the luminance values illustrated in FIG. 3A.

FIG. 7 is a diagram illustrating the image inspection using the luminance values illustrated in FIG. 4a.

FIG. 8 is a flowchart of an exemplary operation of the image inspection, according to a second embodiment of the present disclosure.

In the present embodiment, the maintenance time is output as illustrated in FIG. 8 using the luminance value of the scanned image.

When there is a difference between the luminance values of the rasterized image data and the scanned image data, the reading controller 200 compares the luminance value with a threshold in a portion where a difference occurs between adjacent pixels in the difference image and outputs maintenance information.

FIG. 8 is the same as FIG. 5 except that the "DIFFERENCE OF LUMINANCE DIFFERENCE" from step S12 to step S14 in FIG. 5 is changed to the "LUMINANCE VALUE OF SCANNED IMAGE" from step S22 to step S24, and thus the description of FIG. 8 is omitted.

According to the present embodiment, since a user may prepare for maintenance in advance by outputting the maintenance time in advance. As a result, a reduction in the time during which the device is not used (downtime) is achieved.

Although two thresholds are used for outputting the maintenance time, three or more thresholds or one threshold may be used.

Third Embodiment

Next, descriptions are given of an image inspection according to a third embodiment, with reference to FIGS. 9A, 9B, 10A and 10B.

The present embodiment is different from the above-described embodiments in that stain is detected from a difference in luminance difference between adjacent pixels in scanned image data (the magnitude of a symbol A in FIGS. 9A, 9B, 10A and 10B).

Figure 9A:
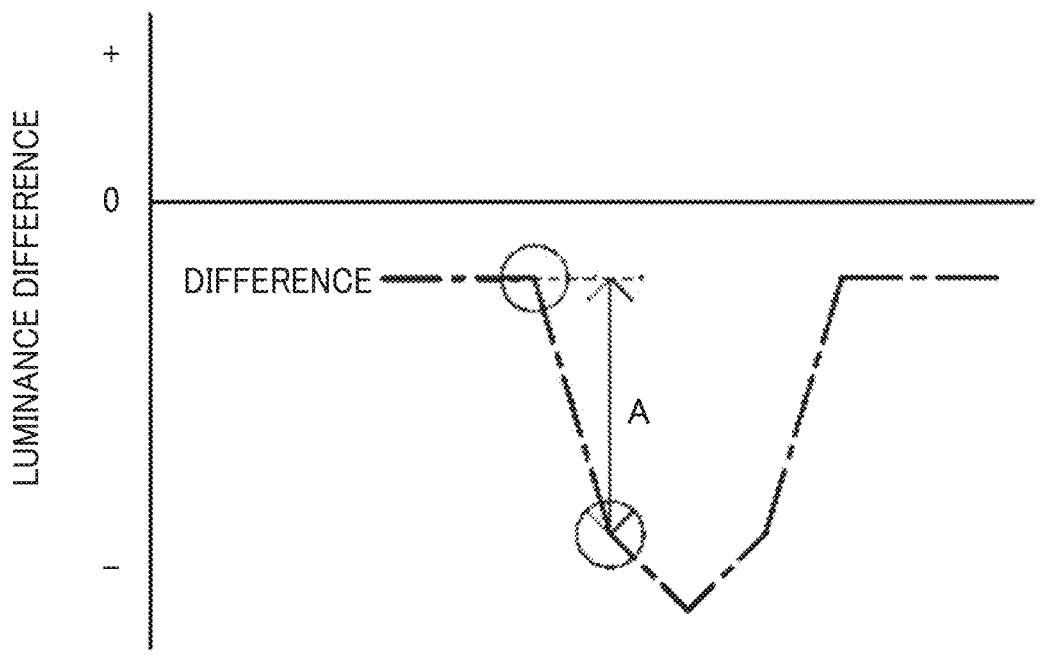
FIGS. 9A and 9B are diagrams illustrating an image inspection using a difference between adjacent pixels in scanned image data.
Figure 9B:
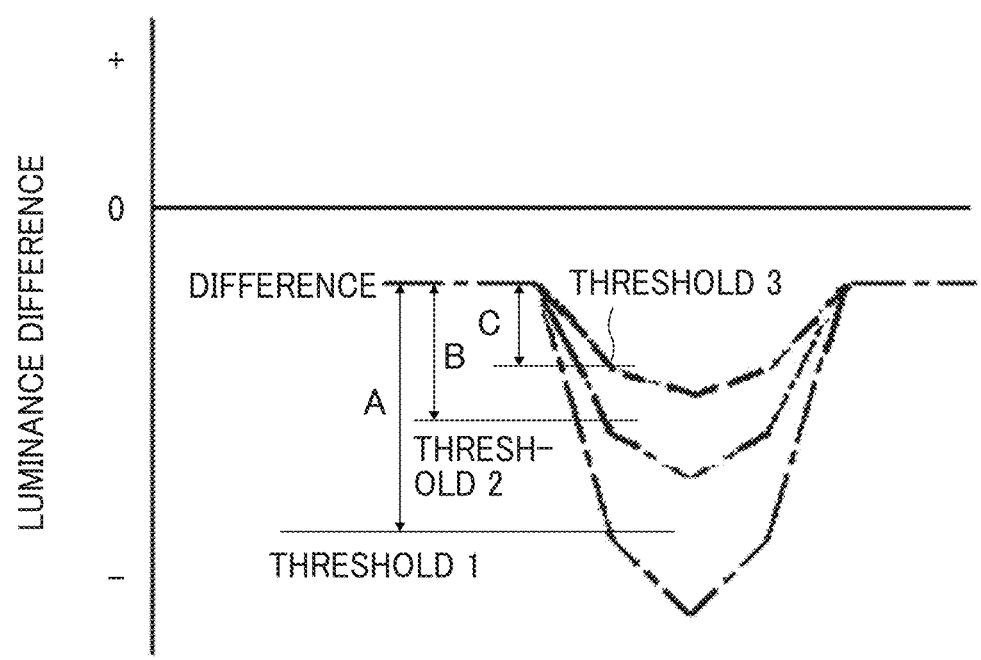

FIGS. 9A and 9B are diagrams illustrating an example of image inspection using a difference of luminance between adjacent pixels in scanned image data. Each of FIGS. 9A and 9B illustrates a luminance value of a difference image that is a difference between scanned image data and rasterized image data corresponding to a difference image in a case where there is a stain on the scanned image illustrated in FIG. 3B.

Figure 10A:
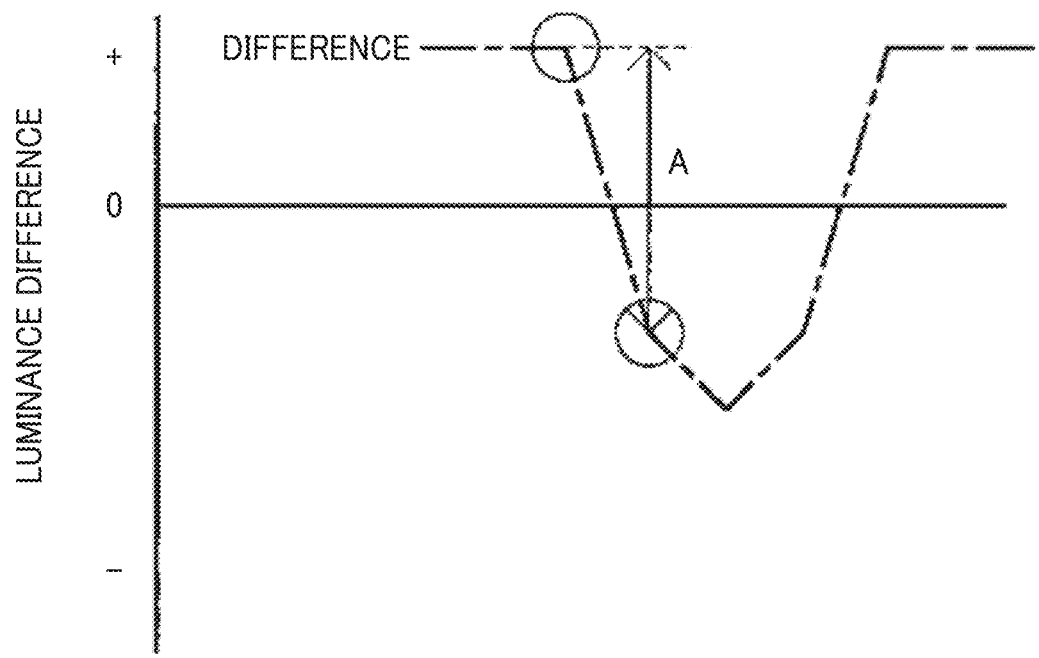
FIGS. 10A and 10B are diagrams illustrating another image inspection using a difference between adjacent pixels in scanned image data.
Figure 10B:
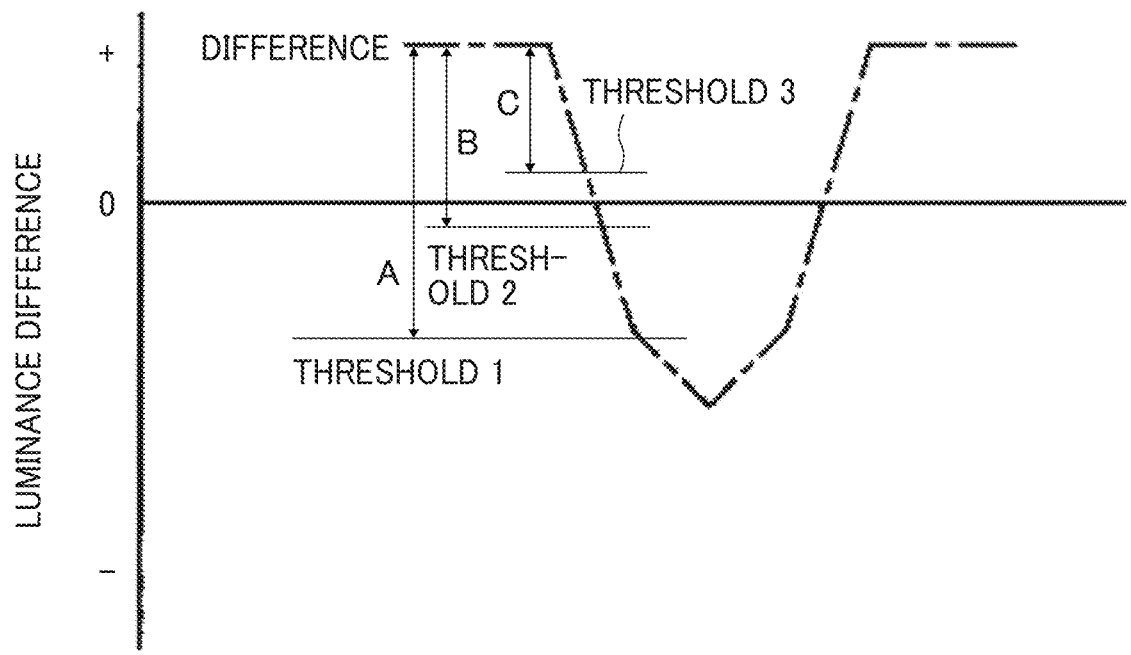

FIGS. 10A and 10B are diagrams illustrating another example of the image inspection using the difference of luminance between adjacent pixels in the scanned image data. Each of FIGS. 10A and 10B illustrates the luminance value of the difference image that is the difference between the scanned image data and the rasterized data corresponding to a difference image in a case where there is a stain on the scanned image illustrated in FIG. 4B.

As illustrated in FIGS. 10A and 10B, in a case where the luminance value of the rasterized image data is holistically low (the color is dark), the luminance value of the difference image is positive in a portion where there is no stain and is negative in a portion where there is a stain. Therefore, the absolute value of the luminance value in the difference image is decreased as illustrated in FIG. 4B. On the other hand, as in the determination in FIGS. 9A and 9B, the inspection method of the present embodiment in FIGS. 10A and 10B determines based on the variation (reference symbol A in FIGS. 10A and 10B) of the luminance value with the adjacent pixel. Therefore, detection of the stain correctly is achieved regardless of the color difference between the scanned image and the rasterized image.

Note that the flowchart of FIG. 5 may be applied to the present embodiment.

According to the present embodiment, since a user may prepare for maintenance in advance by outputting the maintenance time in advance. As a result, a reduction in the time during which the device is not used (downtime) is achieved.

Although two thresholds are used for outputting the maintenance time, three or more thresholds or one threshold may be used.

Fourth Embodiment

Next, descriptions are given of an image inspection according to a fourth embodiment, with reference to FIGS. 11A to 13.

In the present embodiment, information to be compared with a read image is acquired in advance using a print image, and the presence or absence of a defect in the image is determined using the acquired information and the read image. In addition, it is assumed that an image selected in advance is used as an image used for the image inspection.

Figure 11A:
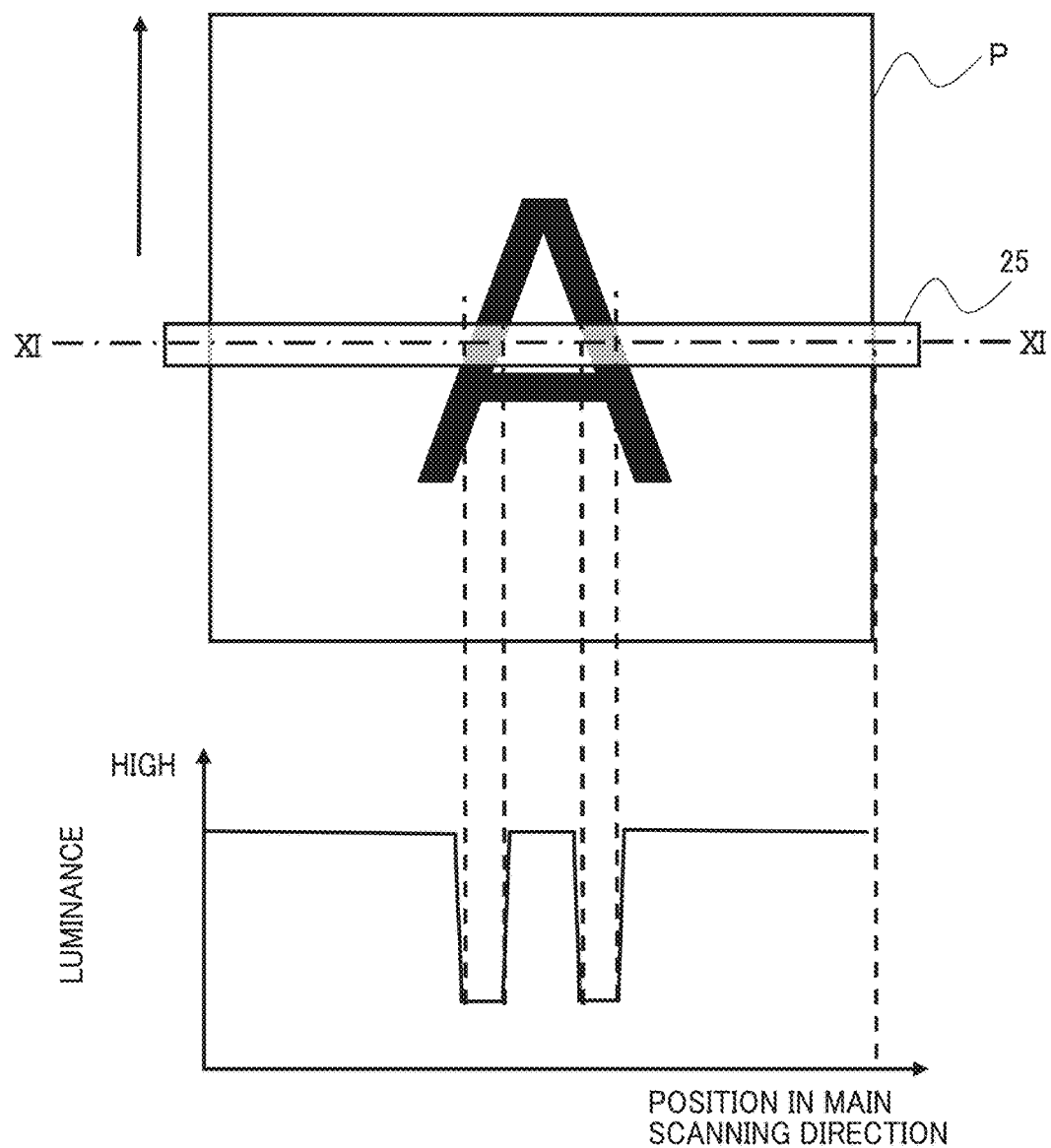
FIGS. 11A and 11B are diagrams illustrating an example of a sheet on which an image used for the image inspection is formed.
Figure 11B:
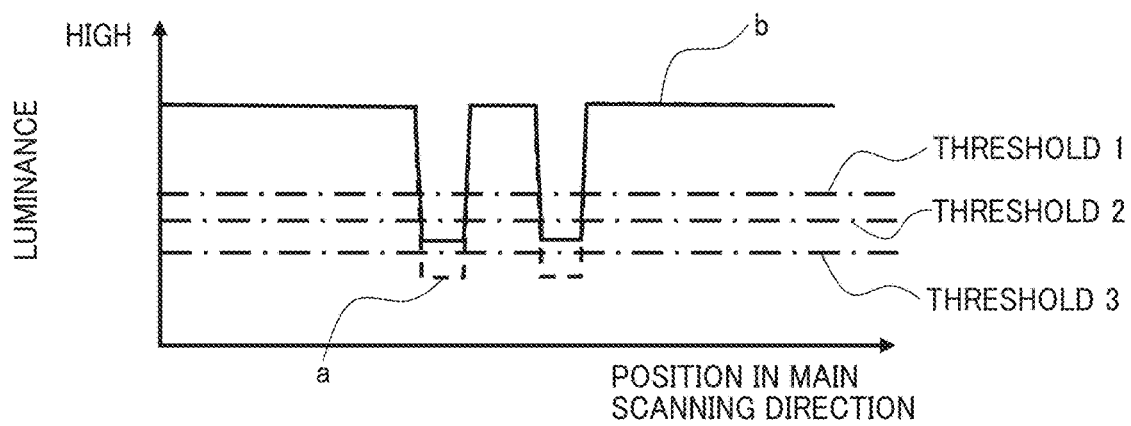

FIGS. 11A and 11B are diagrams illustrating an example of a sheet on which the image used for the image inspection is formed. FIGS. 11A and 11B illustrate an example in which the sheet P on which the image "A" is formed is used for image inspection.

The upper part in FIG. 11A illustrates a relation of positions between the sheet P on which the image is formed and the reading device 25 and the lower part in FIG. 11A illustrates a position in the main scanning direction (width direction) and luminance in a line XI-XI in association with the image.

FIG. 11B is a diagram illustrating the relation between the position in the main scanning direction, the luminance value, and the threshold in XI-XI of FIG. 11A.

Figure 12:
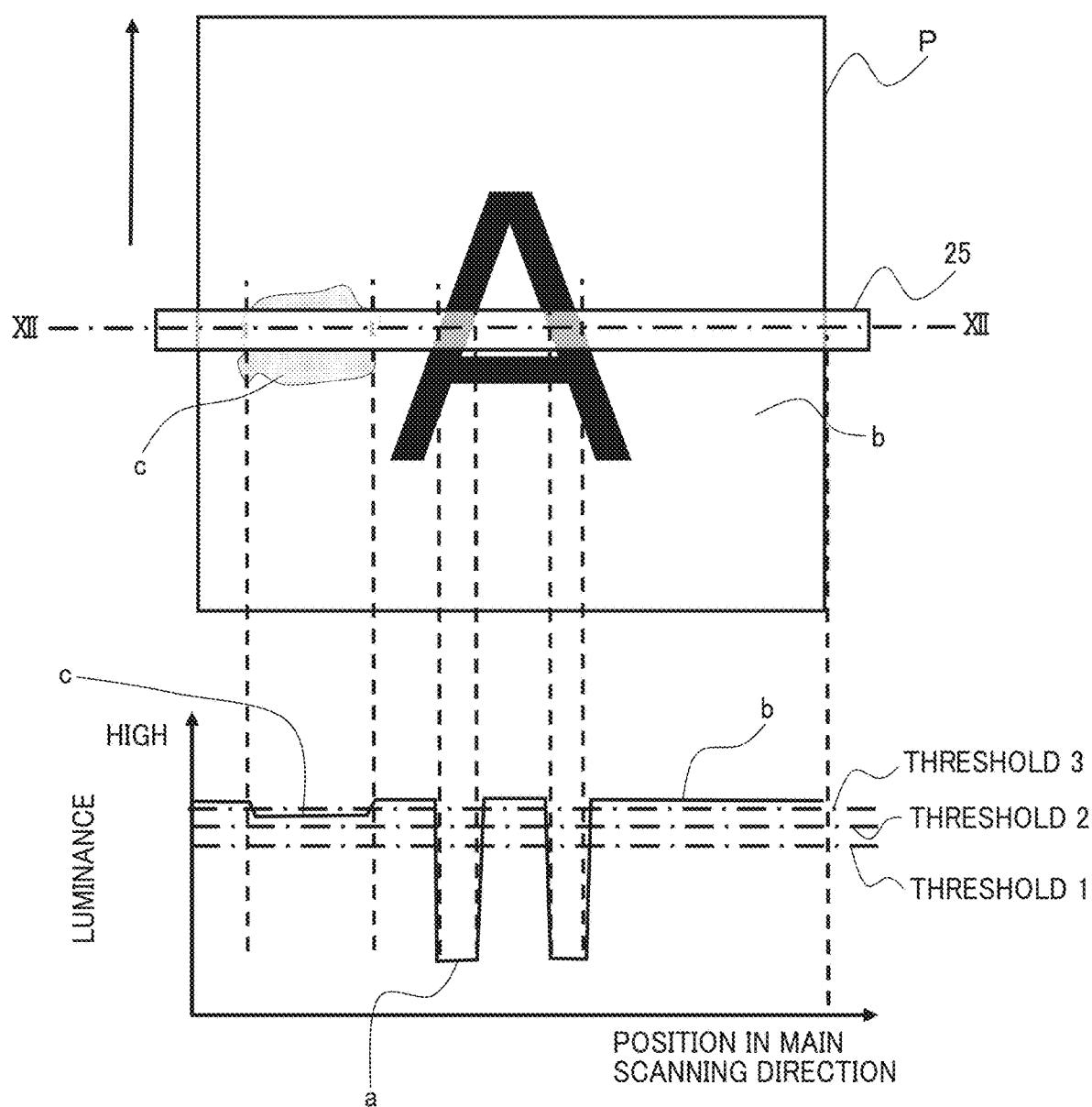
FIG. 12 is a diagram illustrating an example in which a stain adheres to a sheet on which an image is formed.

FIG. 12 is a diagram illustrating an example in which a stain adheres to a sheet on which an image is formed. The upper part in FIG. 12 illustrates that there is a stain at the position "c" on the sheet P. The lower part in FIG. 12 illustrates the position in the main scanning direction in a line XII-XII, the luminance value, and the threshold in association with the image.

In the light received by the line sensor of the reading device 25, the luminance value is relatively high in the blank portion where the irradiated light is reflected, and the luminance value is relatively low in the portion of the image "A" where the irradiated light is less likely reflected.

Therefore, in a case where the color of the image "A" illustrated in FIG. 12 becomes lighter, the luminance value at the position of the symbol a in FIG. 12 where the image "A" is formed becomes higher than when the color is darker.

Further, as illustrated in FIG. 12, in a portion other than the image "A", for example, when there is a stain at the position "c", the luminance value at the position "c" becomes lower than the luminance value at the position "b" on which the image is not formed.

In the present embodiment, the maintenance time is output based on the temporal change of the luminance value.

Figure 13:
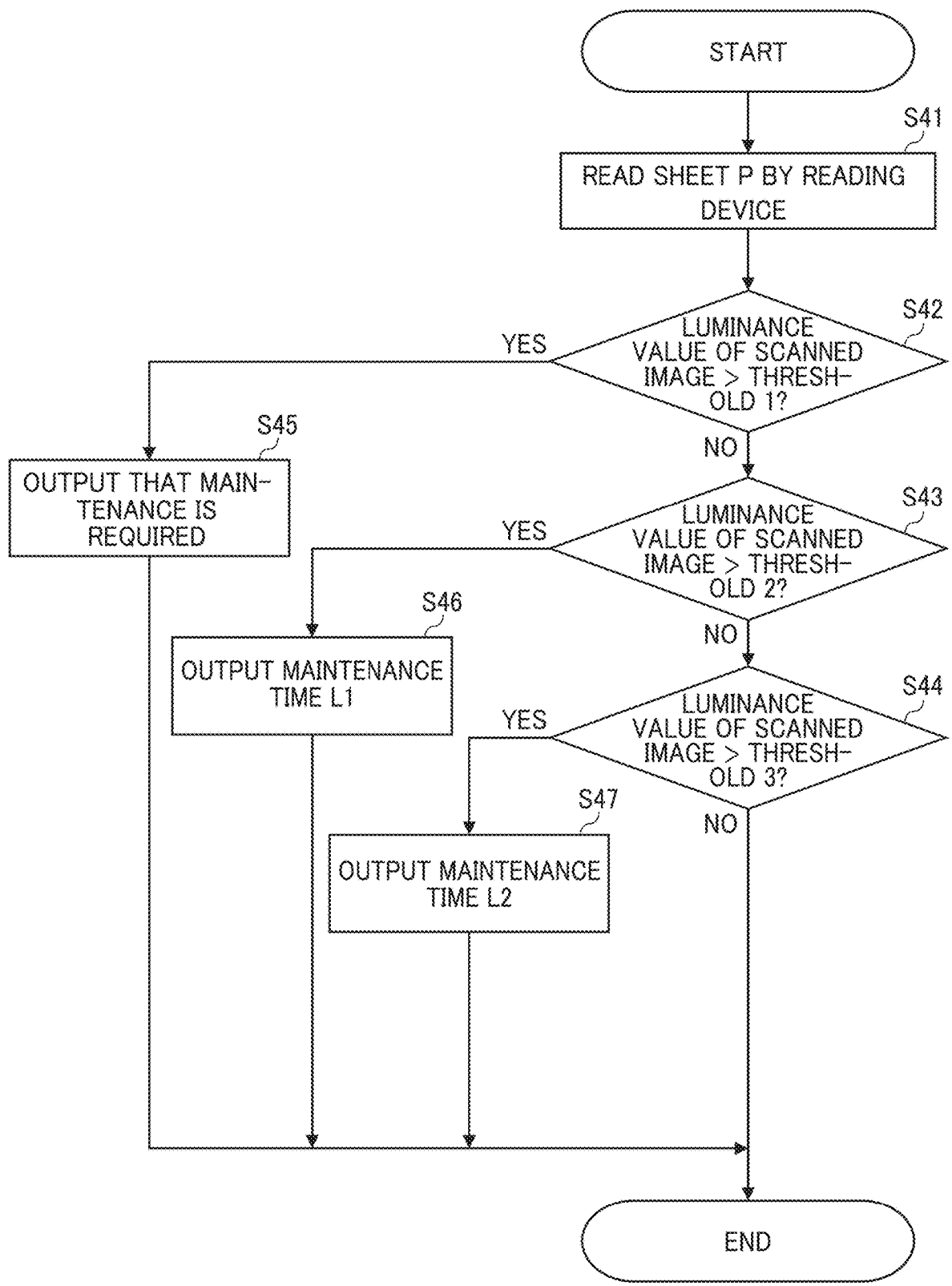
FIG. 13 is a flowchart of an operation of an image inspection according to a fourth embodiment of the present disclosure.

FIG. 13 is a flowchart of an exemplary operation of the image inspection, according to the fourth embodiment of the present disclosure.

One or more thresholds are set in advance using the print image.

In the image inspection, the reading controller 200 inspects luminance values in the main scanning direction at each position or predetermined positions in the sub-scanning direction. In a case where not each position but a predetermined position in the sub-scanning direction is to be inspected, a user sets the predetermined position in the sub-scanning direction in advance based on the print image.

For one or more positions in the sub-scanning direction to be inspected, the position "a" where an image is formed and the position "b" where no image is formed in the main scanning direction are set in advance in association with the position in the sub-scanning direction.

The reading controller 200 refers to or acquires information set in advance such as the threshold, the predetermined position in the sub-scanning direction, or the positions "a" and "b".

In the operation example in FIG. 13, steps S42 to S44 correspond to steps S12 to S14 in FIG. 5 in which the "DIFFERENCE OF LUMINANCE DIFFERENCE" is changed to the "LUMINANCE VALUE OF SCANNED IMAGE", and the process of the operation example in FIG. 13 is substantially the same as the process of the operation example in FIG. 5.

The "LUMINANCE VALUE OF SCANNED IMAGE" from steps S42 to S44 is a luminance value in the main scanning direction at a predetermined position in the sub-scanning direction.

Since steps S11 and S15 in FIG. 13 are the same as steps S11 and S15 in FIG. 5 respectively, descriptions of the process of the operation example in FIG. 13 are omitted.

For steps S46 and S47 of the flowchart in FIG. 13, for example, the following messages are output as maintenance information.

In the example of FIG. 11, it is assumed, for example, that the amount of toner transferred from the intermediate transfer belt 11b in FIG. 1 to the sheet P is reduced. Therefore, the maintenance target such as the intermediate transfer belt 11b is output in addition to the maintenance time. Examples of the display include "Maintenance time of the intermediate transfer belt comes after one month", "Maintenance time of the intermediate transfer belt comes after 100 more sheets are printed", "Cleaning time of the intermediate transfer belt comes after one month", and "Replacement time of the intermediate transfer belt comes after one month".

Further, in the example of FIG. 12, it is assumed that the remaining toner other than the image attached on the intermediate transfer belt 11b is transferred to the position "b" on the sheet P. Therefore, the maintenance target such as the intermediate transfer belt 11b is output in addition to the maintenance time.

In a case where the luminance value at the position "c" in FIG. 12 is obtained in the sub-scanning direction of the sheet, it is assumed that any one of dust, toner, and sheet dust is attached on the exposure glass 723 in FIG. 2 of the reading device 25. Therefore, the maintenance target such as reading device 25 is output in addition to the maintenance time. Examples of the display include "Maintenance time of the reading device comes after one month", "Maintenance time of the reading device comes after 100 more sheets are printed", and "Cleaning time of the reading device comes after one month".

According to the present embodiment, since the maintenance time is output in advance, a user may prepare for maintenance in advance. As a result, a reduction in the time during which the device is not used (downtime) is achieved.

In addition, displaying the maintenance target on the LCD 141 allows a user to prepare a replaceable component in advance in a case where the maintenance target is a component to be replaced. As a result, a reduction in the time during which the device is not used (downtime) is achieved.

Although two thresholds are used for outputting the maintenance time, three or more thresholds or one threshold may be used.

Although the sheet P illustrated in FIGS. 11 and 12 has the image "A" formed on the sheet P, other images such as characters and symbols or a plurality of images having different densities (for example, a gradation patch illustrated in FIG. 16) may be used.

Further, the reading controller 200 may perform image inspection by comparing the print image and the read image and obtaining a difference. In this case, the reading controller 200 may output the maintenance information, for example, in a case where the difference in the position "a" is larger than a predetermined threshold.

Further, a print image of a user that the user intends to print may be used as an image used for image inspection. In such a case, the reading controller 200 acquires the positions "a" and "b" and the thresholds for the print image of the user in advance.

For example, while the image forming system 1 prints a large amount of print images of a user, the reading controller 200 may perform image inspection of the print images of the user. In this manner, detection of a defect of an image over time during a printing period is achieved.

Fifth Embodiment

Figure 14:
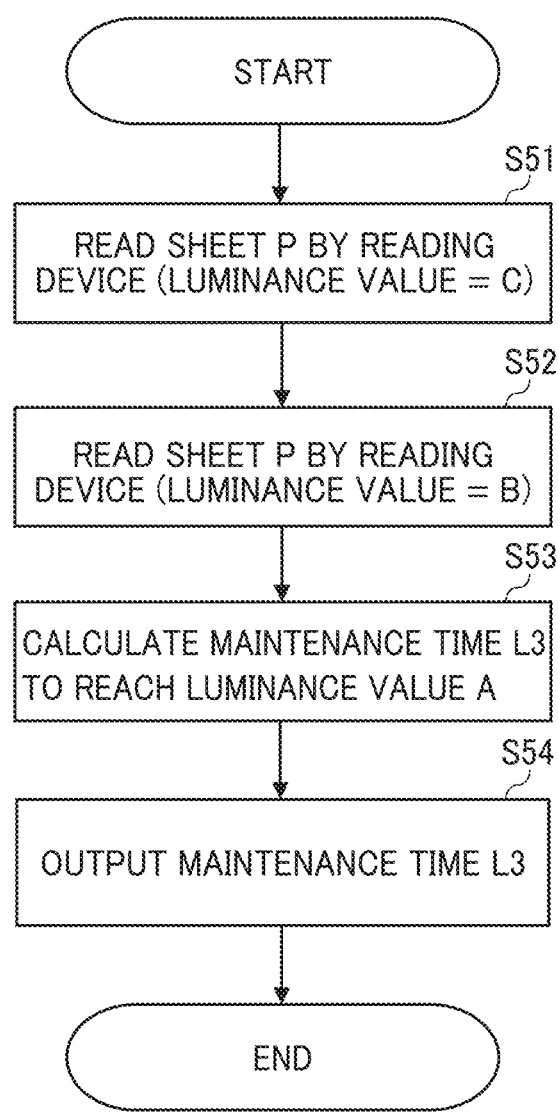
FIG. 14 is a flowchart of an operation of an image inspection according to a fifth embodiment of the present disclosure.

Next, descriptions are given of an image inspection according to a fifth embodiment, with reference to FIG. 14.

The stain in each of the above-described embodiments tends to become worse over time.

Therefore, in the present embodiment, the maintenance time is calculated from the information read by the reading device 25 and the number of printed sheets.

FIG. 14 is a flowchart of an exemplary operation of the image inspection, according to a fifth embodiment of the present disclosure.

The reading device 25 reads the sheet P (step S51). The luminance value at this time is denoted by C. The luminance value C is, for example, a value when there is no stain.

Thereafter, the reading device 25 reads the sheet P and the luminance value B is a value (step S52). The luminance value B is a luminance value when there is a stain or stains.

The reading controller 200 calculates the number of sheets P reaching the luminance value A (luminance value that indicates request for maintenance) from the luminance value B, based on the number of sheets P that have passed through the reading device 25 from the luminance value C to the luminance value B and sets as the maintenance time L3 (step S53).

Instead of the number of sheets P, the time taken from the luminance value C to the luminance value B may be used.

Then, the reading controller 200 outputs the maintenance time L3 to the operating device 140 or the image controller 100 (step S54).

According to the present embodiment, by calculating the maintenance time from the frequency of use of the device, the maintenance time suitable for the use state of the device is output.

Note that the luminance value B or the luminance value C described above may be a luminance value at a predetermined position when the reading device 25 reads a recording medium on which the same image is formed. Alternatively, an average of luminance values of the overall recording medium (or a predetermined portion such as a printing portion) may be used.

Sixth Embodiment

Figures 15A, 15B:
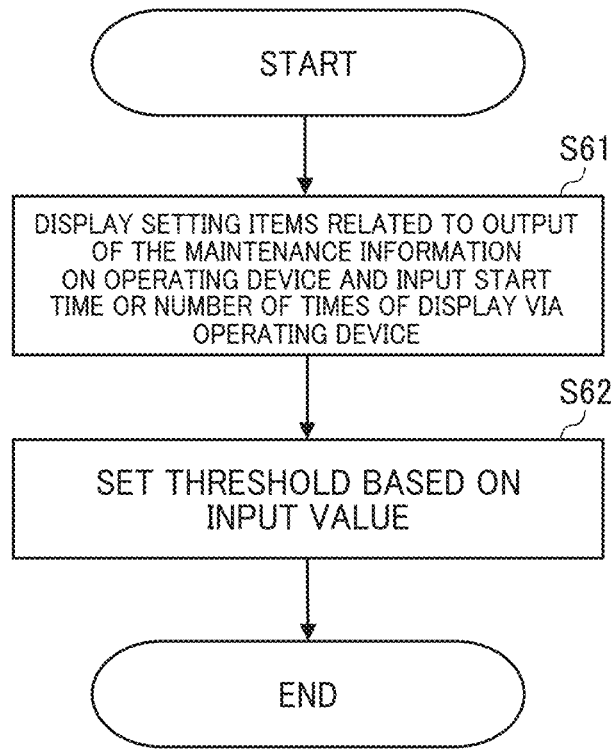
FIG. 15A is a table of an example of setting related to output of maintenance information.
FIG. 15B is a flowchart of an example of the setting related to output of maintenance information.

Next, descriptions are given of an image inspection according to a sixth embodiment, with reference to FIGS. 15A and 15B.

FIG. 15A is a table of a setting related to output of the maintenance information and 15B is a flowchart of the setting related to output of the maintenance information. Specifically, FIG. 15A is a table indicating a setting example of output start time (also referred to as "display start time") and an output count (also referred to as "number of times of display") of the maintenance information input to the operating device 140. FIG. 15B is a flowchart of an operation example of setting a threshold based on the input in FIG. 15A.

For example, the reading controller 200 displays the setting items illustrated in FIG. 15A on the LCD of the operating device 140 and prompts a user to designate the setting values (step S61). The setting value may be designated by selecting the setting value displayed on the LCD or inputting a number.

The output start time of the maintenance information indicates how many months before the maintenance time is displayed.

The number of times of display of the maintenance information indicates how many times the scheduled maintenance time is displayed before the maintenance time is displayed.

The reading controller 200 sets a threshold (the thresholds 1 to 3 in each of the above-described embodiments) corresponding to the setting value in response to input the setting value (step S62). For example, when the set value is three months prior or three times, then threshold 3, threshold 2, and threshold 1 are set. When the set value is two months prior or twice, the threshold 2 and the threshold 1 are set. When the set value is one month prior or once, the threshold 1 is set.

Then, when the luminance value of each of the above-described embodiments reaches the set threshold, the reading controller 200 outputs the maintenance information to the operating device 140 so as to display the maintenance information on the operating device 140.

In the present embodiment, the operating device 140 illustrated in FIG. 1 (or FIG. 22 or FIG. 23 described below) functions as an output setting unit that performs setting related to output of maintenance information under the control of the reading controller 200. The output setting unit may set at least one of the display start time of the maintenance information and the number of times of display of the maintenance information.

According to the present embodiment, a user selects to display the maintenance information at a desired timing or a desired number of times. In this way, the scheduled maintenance time is displayed in accordance with the usage status of the user.

Seventh Embodiment

Figure 16:
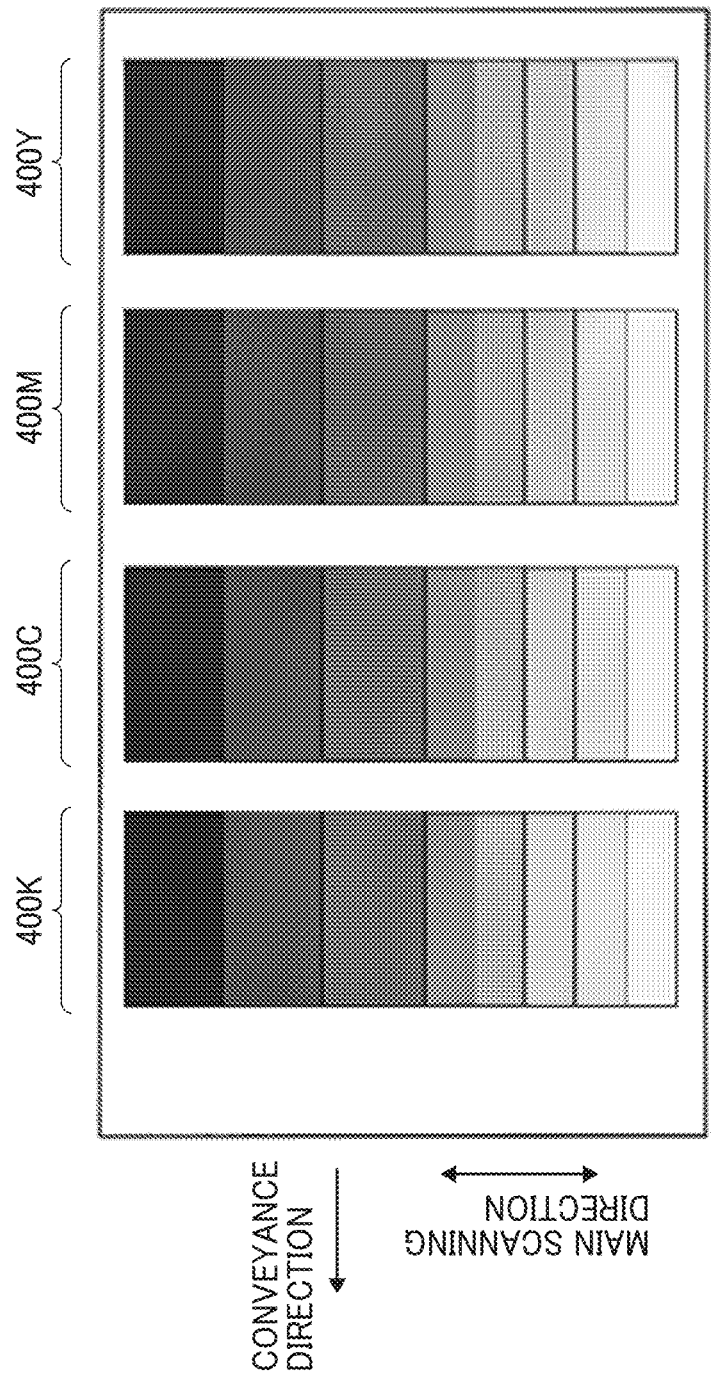
FIG. 16 is a diagram illustrating an example of a sheet on which a plurality of images (gradation patches) having different densities are formed.

Next, descriptions are given of an image inspection according to a seventh embodiment, with reference to FIG. 16.

FIG. 16 is a diagram illustrating an example of the sheet P on which a plurality of images (gradation patches) having different densities are formed. In the present embodiment, a gradation patch is used as an image used for image inspection.

As illustrated in FIG. 16, typical image forming apparatuses form gradation patches for density correction on a sheet P, cause the reading device 25 to read the gradation patches, and correct the amount of toner to be transferred onto the intermediate transfer belt 11b based on the reading result.

In the present embodiment, the result of reading the sheet P illustrated in FIG. 16 by the reading device 25 are used to output the maintenance time with applying to each of the above-described embodiments.

The image formed on the sheet P is an image in which black 400K, cyan 400C, magenta 400M, and yellow 400Y are arranged in this order in the sheet conveyance direction (sub-scanning direction), and each color has a density difference in the main scanning direction.

When the sheet P read by the reading device 25 is a text image or a single color image, information (for example, frequency and color measurement result) may be insufficient for predicting the maintenance time.

On the other hand, according to the present embodiment, since an image having a plurality of colors and a density difference is read by the reading device 25, the prediction of the maintenance time is accurately calculated.

Note that the image to be formed on the sheet P and the arrangement for the respective colors on the sheet P are not limited to the image and arrangement for the respective colors illustrated in FIG. 16.

Eighth Embodiment

Figures 17A, 17B:
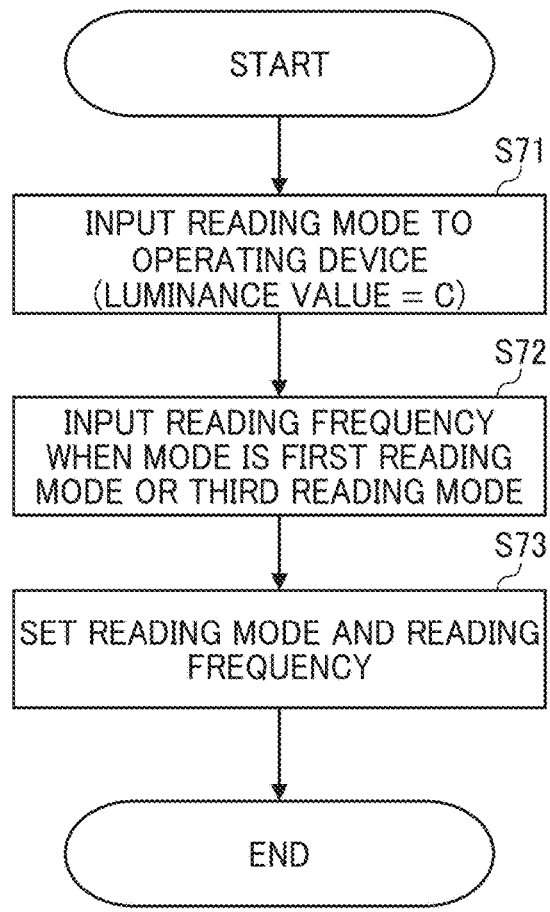
FIG. 17A is a flowchart of an example of setting of a maintenance time.
FIG. 17B is a table of an example of setting of the maintenance time.

Next, descriptions are given of an image inspection according to an eighth embodiment, with reference to FIGS. 17A and 17B.

FIG. 17A is a flowchart of an example of setting of the maintenance time, and FIG. 17B is a table of an example of setting of the maintenance time. FIG. 17A is a flowchart for setting of a reading mode when the reading device 25 reads the sheet P used in calculating the maintenance time. FIG. 17B is a table indicating setting items related to the maintenance information.

For example, a user inputs a request on the operating device 140 to display a selection screen for selecting the reading mode, then the reading controller 200 causes the operating device 140 to display the selection screen based on the user's request and prompts the user to perform an input operation.

The user inputs the reading mode to the operating device 140 (step S71). The reading controller 200 receives the reading mode input by the user.

In regard to the input of the reading mode, the selection number indicated in FIG. 17B may be selected, or the pull-down menu to select the selection number may be used.

As indicated in FIG. 17B, the reading mode includes a first reading mode, a second reading mode, and a third reading mode. The first reading mode is a mode that the reading device 25 reads the sheet P (referred to as "first recording medium") on which a plurality of images (gradation patches) having different densities are formed as illustrated in FIG. 16. The second reading mode is a mode that the reading device 25 reads the sheet P (referred to as "second recording medium") on which a print image is formed. The third reading mode is a mode that the reading device 25 reads the first recording medium and the second recording medium.

The first recording medium may use, for example, the gradation patch illustrated in FIG. 16.

The second recording medium may be, for example, an image used for the image inspection or a print image of the user.

When the first reading mode or the third reading mode is input, the reading controller 200 further causes the operating device 140 to display a selection screen for setting the frequency of reading the sheet P illustrated in FIG. 16, and then prompts the user to perform input. When the user inputs the reading frequency (step S72), the reading controller 200 receives the reading frequency and sets the reading mode and the reading frequency (step S73). This frequency is as illustrated in FIG. 17B.

The reading frequency of one time per 100 sheets in the first reading mode indicates that one first recording medium is conveyed every 100 sheets of the second recording medium that pass through the reading device 25. In this case, the second recording medium is read by the reading device 25 and the image of the sheet is inspected. However, the inspection result at this time is not used as the information for calculating the maintenance time described above. The information read from the first recording medium by the reading device 25 is used as information for calculating the maintenance time by applying each of the above-described embodiments.

The reading frequency of one time per 100 sheets in the third reading mode indicates that the first recording medium is conveyed every 100 sheets of the second recording medium that pass through the reading device 25. In this case, information obtained by reading the second recording medium and the first recording medium by the reading device 25 is used as information for calculating the maintenance time by applying each of the above-described embodiments.

The reading frequency is not set in the second reading mode. Therefore, the result of reading the second recording medium by the reading device 25 is used as information for calculating the maintenance time described above. Note that the reading frequency may be set in the second reading mode. In this case, the result read by the reading device 25 for each predetermined number of second recording media is used as information for calculating the maintenance time described above. Another second recording medium other than the above-described second recording medium is read by the reading device 25, and the image of the second recording medium is inspected. However, the inspection result at this time is not used as the information for calculating the maintenance time described above.

The input of the reading frequency is input from the selection displayed on the LCD 141 or from a pull-down menu to select the selection number.

The reading controller 200 registers the input reading mode and the reading frequency in a memory. The memory may be any storage area to which the reading controller 200 refers.

When the sheet P read by the reading device 25 is a text image or a single color image, information (for example, frequency and color measurement result) may be insufficient for predicting the maintenance time.

On the other hand, according to the present embodiment, since the reading device 25 reads a sheet on which an image having a density difference in a plurality of colors is formed every predetermined number of sheets, the prediction of the maintenance time is accurately calculated.

In a case where the reading frequency set in the first reading mode and the second reading mode reaches the predetermined number of sheets, the first recording medium may be automatically conveyed. Alternatively, the operating device 140 may display whether to convey the first recording medium. In this case, a user specifies whether to convey the first recording medium. In a case where the user specifies to convey the first recording medium, the first medium is conveyed. In a case the user does not specify to convey the first recording medium, the second recording medium is continuously conveyed up to the subsequent reading frequency.

In the present embodiment, the operating device 140 illustrated in FIG. 1 (or FIG. 22 or FIG. 23 described below) functions as a reading setting unit that sets the frequency at which the reading device 25 reads the recording medium under the control of the reading controller 200.

According to the present embodiment, the reading controller 200 outputs maintenance information based on reading information obtained by the reading device 25 at least one of a first recording medium and a second recording medium. The first recording medium has a plurality of images that are formed with different densities. The second recording medium has a print image.

In addition, a user sets the reading mode or the reading frequency of the first recording medium via the reading setting unit to perform the image inspection desired by the user.

Ninth Embodiment

Next, descriptions are given of an image inspection according to a ninth embodiment, with reference to FIGS. 18A, 18B, 19A, 19B, and 19C.

In the ninth embodiment, output of maintenance information is described below.

Figures 18A, 18B:
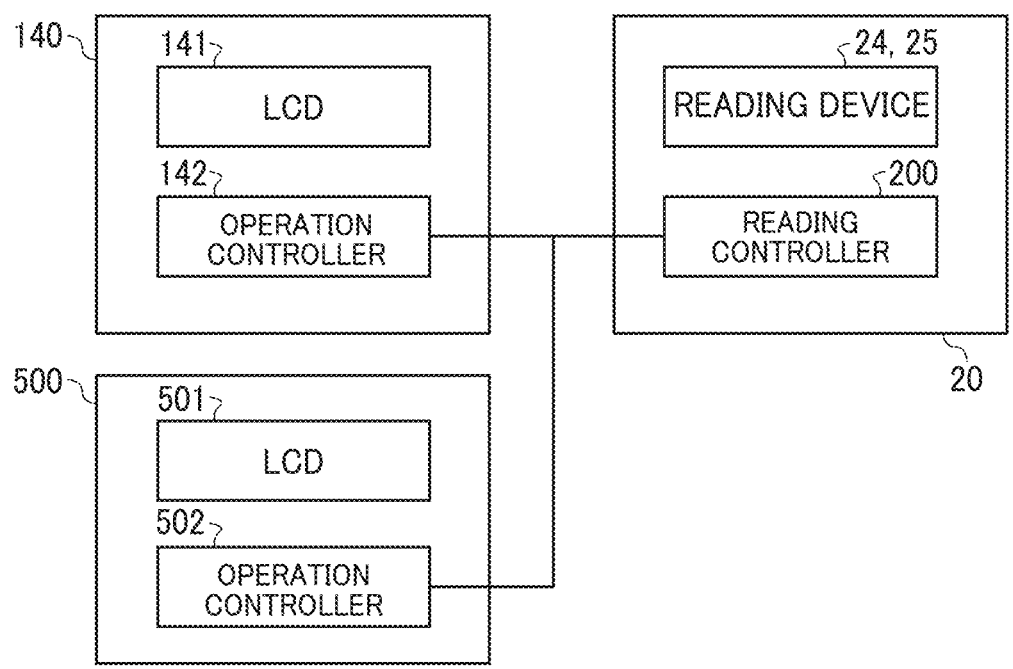
FIG. 18A is a block diagram indicating an output destination of a reading apparatus according to a ninth embodiment of the present disclosure.
FIG. 18B is a table indicating the output destination of the reading apparatus according to the ninth embodiment of the present disclosure.

FIGS. 18A and 18B are diagrams illustrating an output destination of the reading apparatus according to the ninth embodiment of the present disclosure. FIG. 18A is a block diagram according to the present embodiment, and FIG. 18B is a schematic diagram illustrating the output destination, according to the present embodiment.

FIGS. 18A and 18B illustrate the operating device 140 and an information communication terminal 500 as examples of output destinations of the reading apparatus 20. In other words, the reading apparatus 20 is configured to display information on the operating device 140 and an information communication terminal 500.

In the present embodiment, the reading controller 200 outputs the maintenance information not only to the operating device 140 but also to the information communication terminal 500. In other words, the reading controller 200 is configured to display the maintenance information on the operating device 140 and is configured to display the maintenance information on the information communication terminal 500.

The information communication terminal 500 is a device different from the image forming system 1 illustrated in FIG. 1 and may be a device that remotely transmits and receives information, for example, a tablet terminal, or a terminal of a maintenance company. The information communication terminal 500 includes, for example, an LCD 501 and an operation controller 502.

The reading apparatus 20 (or the image forming system 1) and the information communication terminal 500 are configured to communicate with each other in a wired or wireless manner.

The reading controller 200 communicates with the information communication terminal 500.

Figure 23:
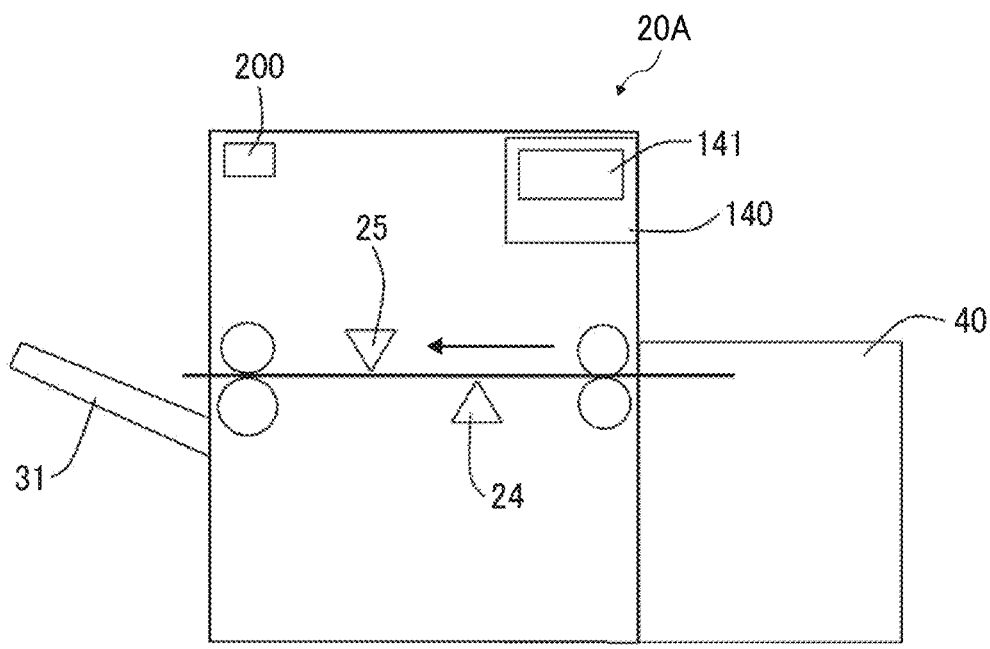
FIG. 23 is a diagram illustrating a schematic configuration of a reading apparatus according to a twelfth embodiment of the present disclosure.

Although FIG. 1 illustrates a configuration example in which the operating device 140 is included in the image forming system 1, the operating device 140 may be included in the reading apparatus 20 as illustrated in FIG. 23 described below.

The operating device 140 is an example of a display unit that displays maintenance information. The operating device 140 has a method of displaying information such as maintenance information by the reading controller 200 and may be disposed at any place as long as the information is displayed.

According to the present embodiment, since a service person grasp the maintenance time (component replacement, cleaning) in advance, the downtime is reduced.

Further, as illustrated in FIG. 18B, the output destination of the maintenance time may be set. For example, as in the eighth embodiment, the reading controller 200 displays a selection screen on the operating device 140 to prompt the user to input the output destination, and thus the reading controller 200 sets the output destination flexibly in response to the usage status of the user.

In the present embodiment, the operating device 140 illustrated in FIG. 1 (or FIG. 22 or FIG. 23 described below) functions as a selection unit that selects an output destination to which maintenance information is output under the control of the reading controller 200.

The reading controller 200, the image controller 100, and an operation controller 142 described in each of the above-described embodiments is configured as illustrated in FIG. 19.

FIG. 19 is a block diagram illustrating input and output of information between a reading controller, an image controller, and an operation controller.

The operation controller 142 is separately included in the operating device 140, inputs and outputs (transmits and receives) information to and from other devices such as the reading controller 200 and the image controller 100, and controls processing of the operating device 140.

Figure 19A:
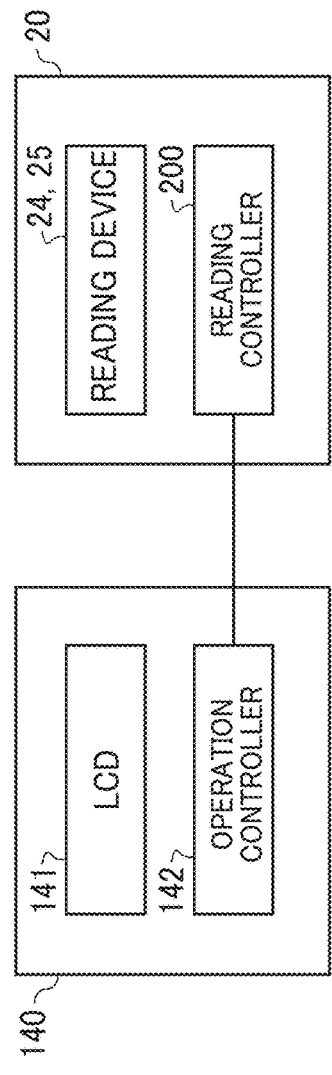
FIGS. 19A, 19B and 19C are block diagrams illustrating input and output of information between a reading controller, an image controller, and an operation controller.

For example, as illustrated in FIG. 19A, the reading controller 200 may output maintenance information to the operation controller 142 of the operating device 140.

Figure 19B:
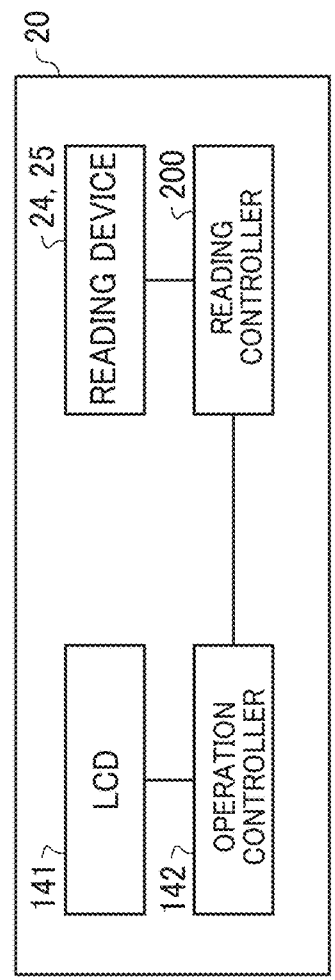

In addition, as illustrated in FIG. 19B, the reading apparatus 20 may include an operating device, and the maintenance information may be output from the reading controller 200 to the operation controller 142 inside the reading apparatus 20.

Figure 19C:
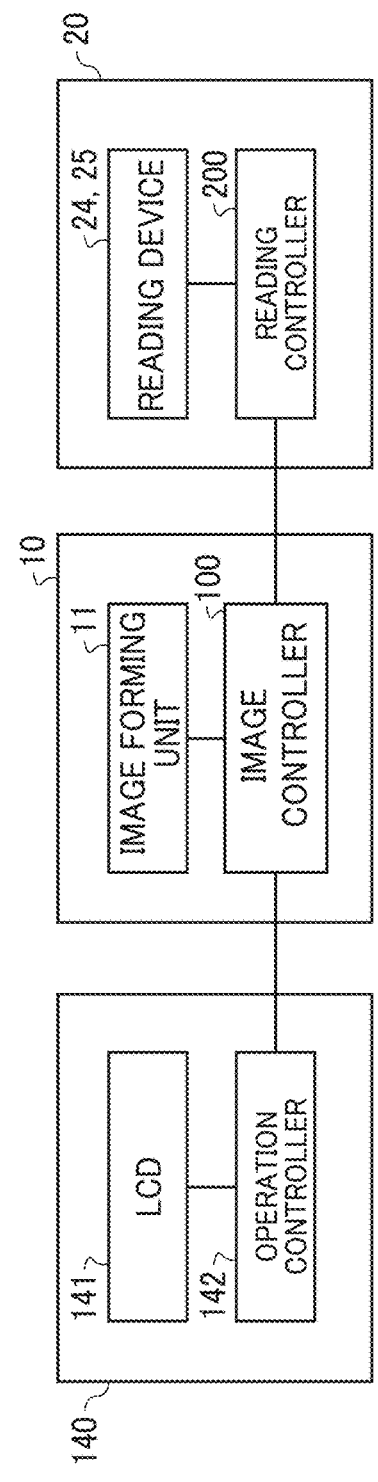

Further, as illustrated in FIG. 19C, maintenance information may be output from the reading controller 200 to the operation controller 142 via the image controller 100.

In addition, although the maintenance time is output from the reading controller 200 to the operating device 140 in each of the above-described embodiments, the reading controller 200 may output acquired information to the operation controller 142, and the operation controller 142 may perform control to display information such as maintenance time on the LCD.

The information and determination methods to calculate the maintenance time are not limited to each of the above-described embodiments.

As described above, in the reading apparatus 20 of FIG. 1 (or FIG. 22 or FIG. 23 described below), the reading controller 200 as an output unit acquires the maintenance information based on read information read by the reading devices 24 and 25, and outputs the maintenance information to a predetermined output destination.

For example, one or more of the following processing is used as the processing in which the reading controller 200 outputs the maintenance information to a predetermined output destination:

The reading controller 200 outputs the maintenance information to the image controller 100 or the image forming unit 11;

The reading controller 200 causes the operating device 140 to display the maintenance information;

The reading controller 200 performs control to transmit the maintenance information to the information communication terminal 500 of the service person; and In the image forming system 1, the reading controller 200 outputs (transmits) maintenance information to the image controller 100. In response to receipt the maintenance information, the image controller 100 causes the operating device 140 to display the maintenance information or transmits the maintenance information to the information communication terminal 500 of the service person.

Tenth Embodiment

Figure 20A:
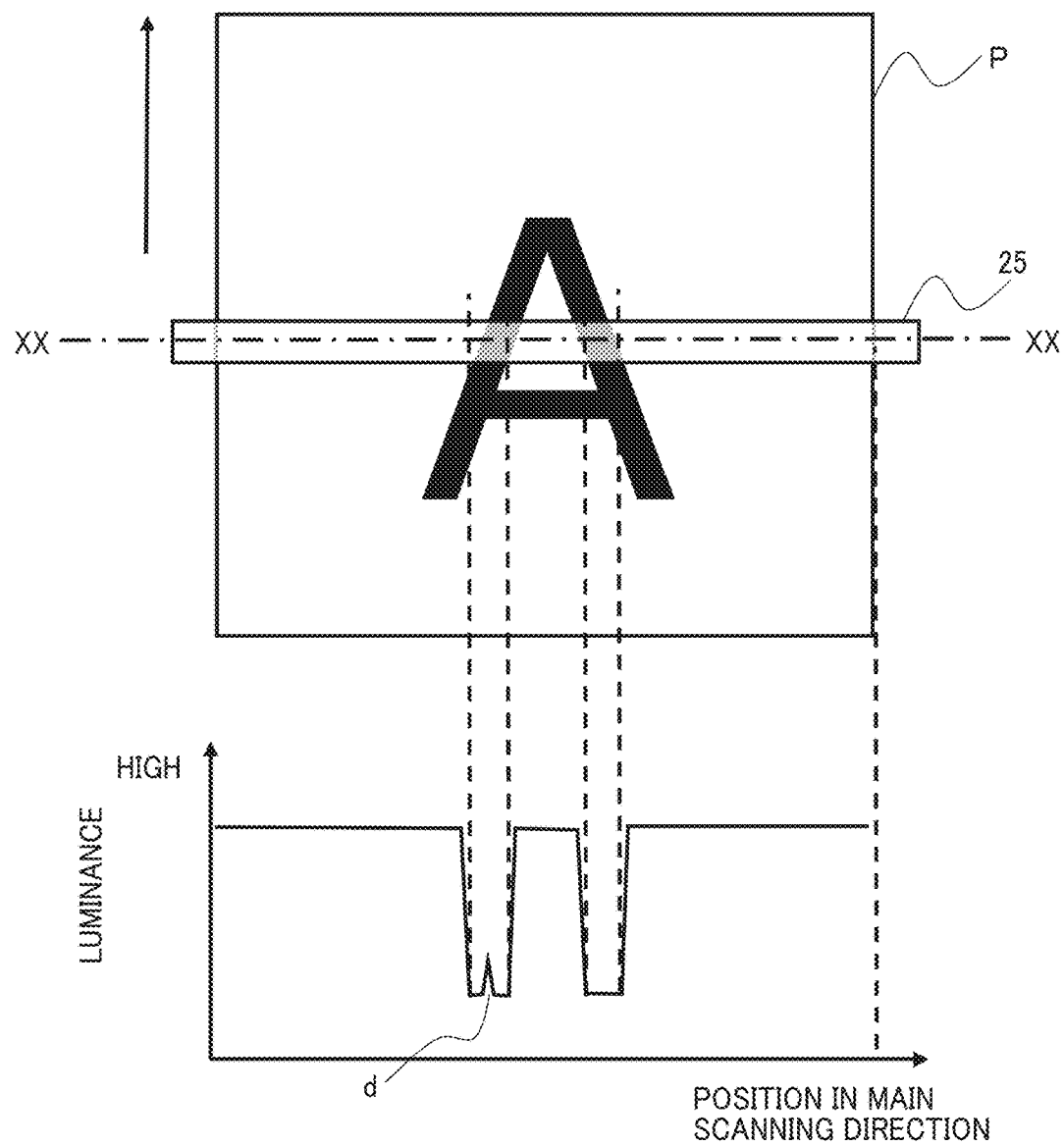
FIGS. 20A and 20B are diagrams illustrating an example in which stain adheres to a sheet on which an image is formed, according to a tenth embodiment of the present disclosure.
Figure 20B:
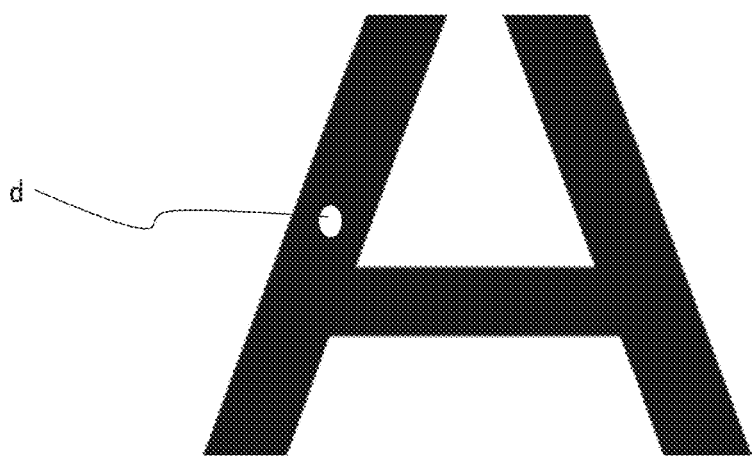
Figure 21:
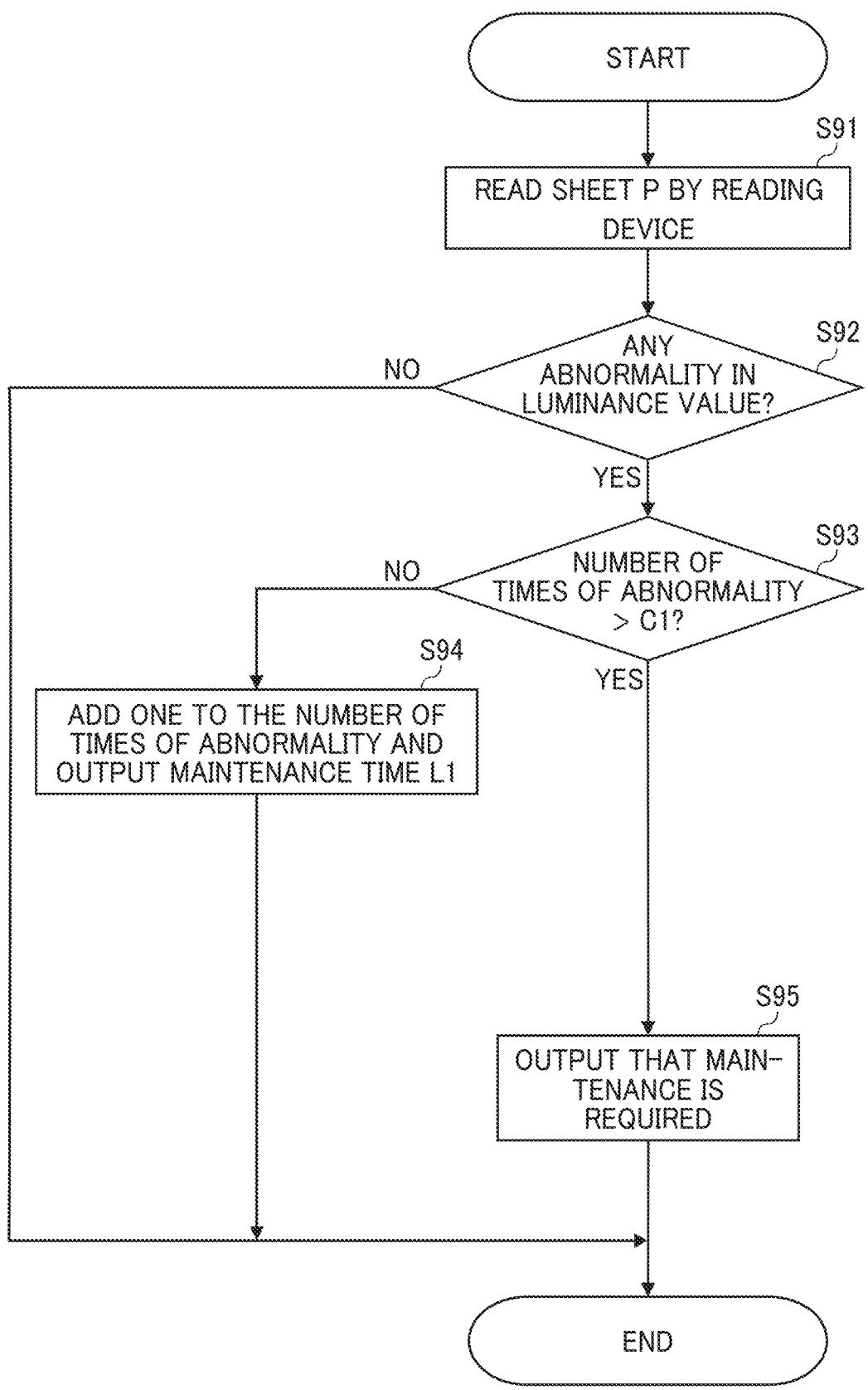
FIG. 21 is a flowchart of an operation of outputting maintenance information of the image inspection at a predetermined timing.

Next, descriptions are given of an image inspection according to the tenth embodiment, with reference to FIGS. 20A, 20B and 21.

In the tenth embodiment, a relation between a stain adhering on a sheet and an output of maintenance information is described.

FIGS. 20A and 20B are diagrams illustrating an example in which the stain adheres to the sheet on which an image is formed.

The upper part in FIG. 20A illustrates a relation of positions between the sheet P and the reading device 25. The lower part in FIG. 20A illustrates a position in the main scanning direction and luminance in a line XX-XX in association with the image.

FIG. 20B is a diagram illustrating the stain attached on the sheet P.

For example, as illustrated in FIG. 20B, in a case where a portion of the printed image is missing or dirty, which is indicated by reference symbol "d" in FIG. 20B and referred to as "stain d", when a color of the image is black and a color of the stain "d" is white, the luminance value of the stain "d" increases as illustrated in FIG. 20A. FIG. 20B is an enlarged view of the image illustrated in FIG. 20A, in which the stain "d" is magnified for convenience of explanation. In the present embodiment, assuming that the stain "d" illustrated in FIG. 20B is not a problem as the quality of the output medium, or is not visually recognized, the maintenance time is output according to the flowchart in FIG. 21.

FIG. 21 is a flowchart of an exemplary operation of outputting the maintenance information of the image inspection at a predetermined timing.

In FIG. 21, it is assumed that the number of times of the stain "d" increases as time elapses.

The reading device 25 reads the sheet P (step S91). The reading controller 200 receives the read image, then confirms the luminance value corresponding to the stain "d" in the read image. When the presence of the stain "d" is confirmed, the reading controller 200 determines that an abnormality is detected (step S92).

Then, it is determined whether an abnormality is detected in the luminance value (step S92). When the abnormality is detected (YES in step S92), the reading controller 200 determines whether the number of times of abnormality in which the occurrence of abnormality is measured exceeds an abnormality occurrence threshold C1 (step S93). The abnormality occurrence threshold C1 is the number of times that maintenance is recommended.

When the number of times of abnormality does not exceed the abnormality occurrence threshold C1 (NO in step S93), maintenance is not yet recommended. In this case, the reading controller 200 adds one to the number of times of abnormality and outputs a maintenance time L1 to the operating device 140 (step S94).

When the number of times of abnormality exceeds the abnormality occurrence threshold C1 (YES in step S93), maintenance is recommended. In this case, the reading controller 200 causes the operating device 140 to output maintenance information indicating that maintenance is recommended (step S95).

In the operation example according to FIG. 21, the reading controller 200 holds the abnormality occurrence threshold C1 in advance and initializes the value of the number of times of abnormality after the processing of step S95 or at the time of initialization processing.

According to the present embodiment, the reading controller 200 output the recommended maintenance time based on the read information (information in the print area of the recording medium) read by the reading device 25 at a plurality of different timings. In other words, the reading controller 200 is configured to output recommended maintenance information.

Eleventh Embodiment

Image formation on the sheet P in each of the above-described embodiments is not limited to electrophotographic image formation.

Figure 22:
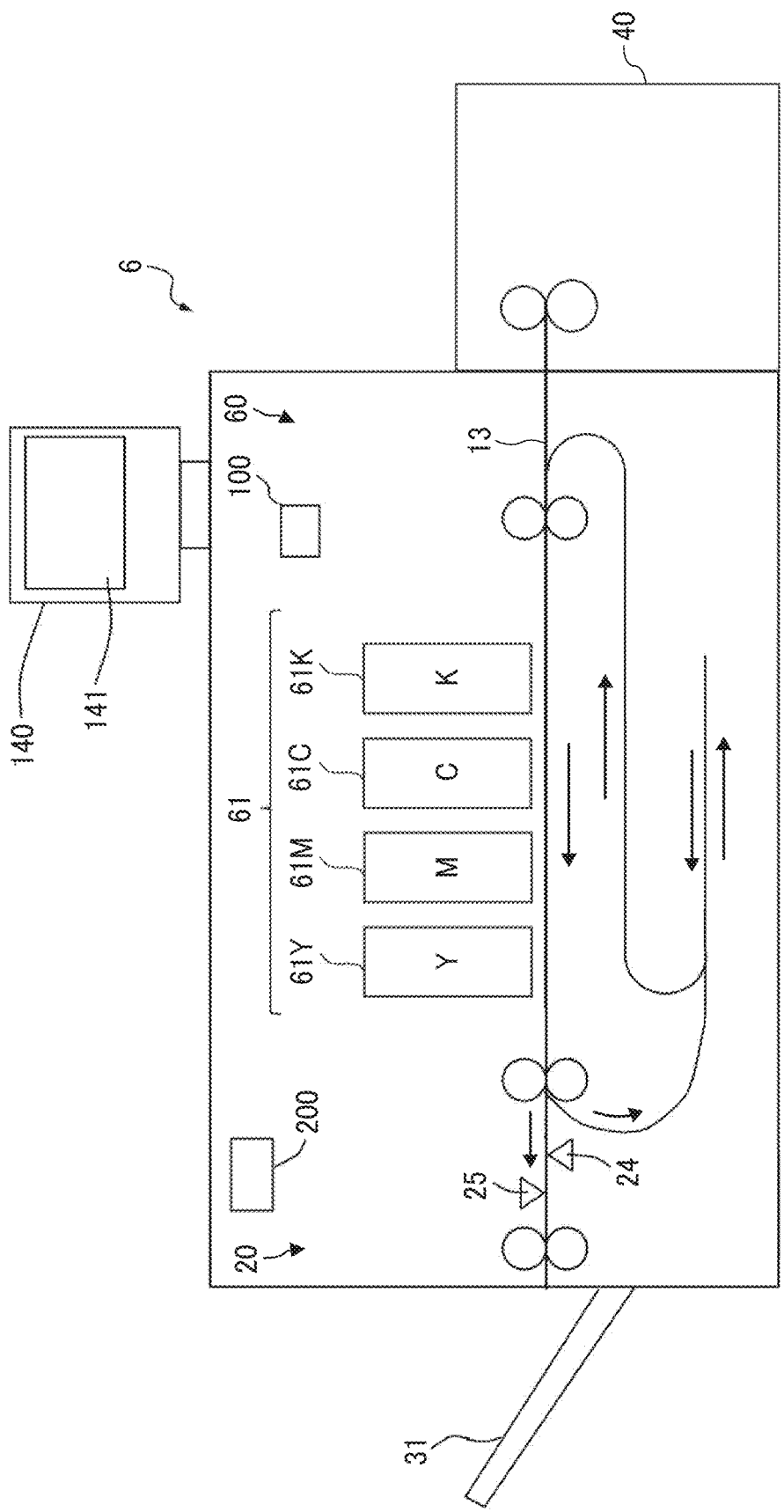
FIG. 22 is a diagram illustrating a schematic configuration of an image forming system according to an eleventh embodiment of the present disclosure.

For example, inkjet image formation illustrated in FIG. 22 is applied to the image formation on the sheet P in each of the above-described embodiments.

FIG. 22 is a diagram illustrating schematic configuration of an image forming system 6, according to an eleventh embodiment of the present disclosure. The image forming system 6 according to the present embodiment includes an image forming apparatus 60 based on the inkjet image formation.

An image forming unit 61 includes liquid discharge heads 61K, 61C, 61M, and 61Y that discharge liquid. An image is formed by the ink discharged from the liquid discharge heads 61K, 61C, 61M, and 61Y onto the sheet P. Thereafter, the sheet P is read by the reading devices 24 and 25, each of the above-described embodiments is applied, and the reading controller outputs the maintenance time to the operating device 140.

Twelfth Embodiment

Further, each of the above-described embodiments is also applied to the reading apparatus 20 that does not include an image forming unit.

FIG. 23 is a diagram illustrating schematic configuration of a reading apparatus, according to a twelfth embodiment of the present disclosure.

For example, a sheet printed by another image forming apparatus is set in the sheet feeding device 40 of a reading apparatus 20A. Then, the sheet P fed from the sheet feeding device 40 is read by the reading devices 24 and 25, and the reading controller outputs the maintenance time to the operating device 140 according to each of the above-described embodiments.

Note that the reading apparatus 20A may not include the operating device 140, and the maintenance time may be output to an external display terminal. In addition, a maintenance time related to a portion of the image forming apparatus may be output from the reading apparatus 20A to the image forming apparatus that has formed an image on the sheet P.

In each of the above-described embodiments, the reading controller 200 may hold, in advance, information used for image inspection, such as a threshold and an abnormality occurrence threshold in a storage area included in the reading apparatus 20A. Alternatively, the reading controller 200 may read the information from a storage area that is referred to by the reading controller 200, for example, a storage area of the image forming apparatus 10. Alternatively, the reading controller 200 may receive the information from another device through communication.

As described above, according to each of the above-described embodiments, a reduction in the time during which the device is not used (downtime) is achieved.

Further, one or more of the above-described embodiments may be appropriately combined and implemented.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image forming apparatus comprising:
processing circuitry configured to
   receive read information from a reading device,
   determine maintenance information to output based on a plurality of thresholds and a luminance value in read information, and
   output the maintenance information,
   wherein the plurality of thresholds include a first threshold, a second threshold, and a third threshold,
wherein the determining the maintenance information to output includes
   in response to the luminance value being greater than the first threshold determining to output maintenance information including an indication of required maintenance,
   in response to the luminance value not being greater than the first threshold and the luminance value being greater than the second threshold determining to output maintenance information including an indication of a first maintenance time, and
   in response to the luminance value not being greater than the first threshold and the second threshold and the luminance value being greater than the third threshold determining to output maintenance information including an indication of a second maintenance time different from the first maintenance time.

2. A system comprising:

the image forming apparatus of claim 1, and the reading apparatus configured to read the information including a luminance value.

3. The system of claim 2 further comprising:

a post-processing apparatus configured to perform at least one of stapling, whole punching, folding, and stitching.

* * * * *